United States Patent
Choi et al.

(10) Patent No.: US 7,031,277 B2
(45) Date of Patent: Apr. 18, 2006

(54) METHOD FOR PERFORMING USTS HANDOVER AND USTS MODE SWITCHING IN A MOBILE COMMUNICATION SYSTEM

(75) Inventors: Sung-Ho Choi, Songnam-shi (KR); Hyun-Woo Lee, Suwon-shi (KR); Seong-Ill Park, Kunpo-shi (KR); Ho-Kyu Choi, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 938 days.

(21) Appl. No.: 09/908,145

(22) Filed: Jul. 18, 2001

(65) Prior Publication Data

US 2002/0051431 A1    May 2, 2002

(30) Foreign Application Priority Data

| Jul. 18, 2000 | (KR) | 2000-41166 |
| Jul. 21, 2000 | (KR) | 2000-42067 |
| Feb. 21, 2001 | (KR) | 2001-8797 |

(51) Int. Cl.
H04J 1/16 (2006.01)
H04J 3/14 (2006.01)

(52) U.S. Cl. ............ 370/331; 370/350; 370/503; 455/436; 455/442; 455/502; 455/522

(58) Field of Classification Search ......... 370/281, 370/295, 344, 350, 389, 319, 503, 510, 512, 370/520, 331

See application file for complete search history.

(56) References Cited

U.S. PATENT DOCUMENTS

6,657,988 B1 * 12/2003 Toskala et al. ............ 370/350

FOREIGN PATENT DOCUMENTS

| JP | 9-505950 | 6/1997 |
| WO | WO 99/44306 | 9/1999 |

OTHER PUBLICATIONS

SK Telecom: "Uplink Synchronous Transmission Scheme", TSG-RAN Working Group 1 Meeting #7 bis, Sep. 4-5, 1999.

* cited by examiner

*Primary Examiner*—Seema S. Rao
*Assistant Examiner*—Inder Pal Mehra
(74) *Attorney, Agent, or Firm*—Dilworth & Barrese LLP

(57) ABSTRACT

Disclosed is a handover controlling method in an RNC connected to a first Node B and a second Node B in a mobile communication system where a USTS service occurs between the first Node B and a UE within a cell of the first Node B and the UE hands over when the UE is located in a handover area across the cell areas of the first Node B and the second Node B adjacent to the first Node B. The method comprises determining whether the handover for the UE is possible or not; transmitting handover information to the second Node B if the handover is possible; and transmitting a command to the UE through the first Node B, requesting the UE to hand over to the second Node B if the UE receives a response message indicating that the handover is possible from the second Node B.

34 Claims, 14 Drawing Sheets

METHOD FOR PERFORMING USTS HANDOVER AND USTS MODE SWITCHING IN A MOBILE COMMUNICATION SYSTEM

PRIORITY

This application claims priority to an application entitled "Method for Synchronization and Handover for Uplink Synchronous Transmission Scheme in a W-CDMA Communication System" filed in the Korean Industrail Property Office on Jul. 18, 2000 and assigned Serial No. 2000-41166, an application entitled "Method for Synchronization and Handover for Uplink Synchronous Transmission Scheme in a W-CDMA Communication System" filed in the Korean Industrail Property Office on Jul. 21, 2000 and assigned Serial No. 2000-42067, and an application entitled "Method for Synchronization and Handover for Uplink Synchronous Transmission Scheme in a W-CDMA Communication System" filed in the Korean Industrail Property Office on Feb. 21, 2001 and assigned Serial No. 2001-8797, the contents of each of which are hereby incorporated by reference.

BACKGROUND OF THE INVENTION

1. Field of the Invention

The present invention relates generally to a channel communication method in a mobile communication system, and in particular, to a method for performing a handover and mode switching using an uplink synchronous transmission scheme (USTS).

2. Description of the Related Art

A CDMA (Code Division Multiple Access) mobile communication system is divided into a synchronous system and an asynchronous system. Such a CDMA communication system uses orthogonal codes to separate channels. Herein, a description of the invention will be made with reference to an asynchronous W-CDMA (Wideband-CDMA) communication system, also known as a UMTS (Universal Mobile Telecommunications System) communication system. However, the invention can also be applied to different CDMA systems such as the CDMA-2000 system, as well as the W-CDMA system.

The W-CDMA communication system employs an uplink synchronous transmission scheme (USTS) in which a first Node B communicates with a plurality of UEs (User Equipments) through radio links formed between them while maintaining an orthogonal property among the signals received from the respective UEs. For the USTS, the Node B transmits a control signal to the UEs so that the respective UEs can transmit their signals at a time proper to maintain the orthogonal property among the UEs. Upon receipt of the control signal, the UEs align a transmission time of the uplink signals.

FIG. 1 illustrates architecture of a conventional W-CDMA communication system. As illustrated, a radio network controller (RNC) controls a process for connecting the UE. Further, the RNC manages assignment of channel resources to the UEs connected to one or more Node Bs. The Node Bs and the RNC constitute a UTRAN (UMTS Terrestrial Radio Access Network).

When successfully connected to the Node B through the channel assigned by the RNC, the UE maintains communication using the assigned downlink or uplink dedicated physical channel (DPCH). The RNC can communication with a plurality of UEs through the Node B. In this case, the UE scrambles its transmission data using its unique scrambling code and transmits the scrambled data as an uplink signal, so that the Node B can distinguish the uplink signals received from the respective UEs by descrambling each uplink signal with UE's unique scrambling code.

The scrambling code is classified into a long scrambling code and a short scrambling code. In the following description, the "scrambling code" will refer to the long scrambling code.

The scrambling code is created in the following process of:

(Step 1) receiving 24 initial values n0,n1, ... ,n23, (Step 2) creating sequences x(i) and y(i), where i=0, ... , $2^{25}-27$, x(0)=n0, x(1)=n1, x(2)=n2, ... , x(23)=n23, x(24)=1 x(i+25)=x(i+3)+x(i) modulo 2, i=0, ... , $2^{25}-27$ y(0)=y(1)=y(2)= ... =y(23)=y(24)=1 y(i+25)=y(i+3)+y(i+2)+y(i+2)+y(i) modulo 2, i=0, ... , $2^{25}-27$.

(Step 3) creating a sequence z(i), where i=0, ... , $2^{25}-2$, z(i)=x(i)+y(i) modulo 2, i=0, ... , $2^{25}-2$, (Step 4) creating a Gold sequence Z(i), where i=0, ... , $2^{25}-2$, Z(i)=1−2*z(i)

(Step 5) creating two real scrambling codes c1(i) and c2(i), where i=0, ... , $2^{25}-2$, c1(i)=Z(i) c2(i)=Z((i+16777232) modulo ($2^{25}-1$)), (Step 6) creating a scrambling code C(i), where i=0, ... , $2^{25}-2$, C(i)=c1(i)*(1+j(−1)$^{i}$*c2(2*$\lfloor i/2 \rfloor$)).

In the above formula, $\lfloor i/2 \rfloor$ indicates the largest integer less than or equal to i/2.

In the W-CDMA communication system, one frame is comprised of 38400 chips. Therefore, the scrambling code is used in a unit of 38400 chips. That is, a scrambling code for one DPCH is C(i), where i=0,1, ... ,38399.

A single DPCH frame signal is scrambled using the scrambling code C(0) to C(38399). The respective UEs create its unique scrambling code using different initial values n0,n1, ... ,n23, and then, scramble the DPCH signal with the created unique scrambling code before transmission. The Node B then descrambles the signals received from the UEs using each unique scrambling codes uniquely assigned to the respective UEs, thereby distinguishing the signals from the respective UEs.

The latest W-CDMA communication system uses OVSF (Orthogonal Variable Spreading Factor) codes for down link channel separation. In the case of the downlink, the Node B can distinguish the downlink DPCH (DL DPCH) signals transmitted to the different UEs using different OVSF codes. The Node B spreads the DL DPCH signals using the OVSF codes uniquely assigned to the respective UEs, sums up the spread DL DPCH signals, scrambles the summed DL DPCH signal with its unique scrambling code, and then transmits the scrambled DL DPCH signal. The respective DPCHs may have different data rates. In the case of the uplink, the UE spreads a uplink DPDCH (Dedicated Physical Data CHannel) signal and a DPCCH (Dedicated Physical Control CHannel) signal constituting a DPCH signal, using different OVSF codes, and scrambles the spread DPDCH and DPCCH signals with its unique scrambling code before transmission. The OVSF codes used by the UE to spread the DPDCH and DPCCH signals may also be its identical to each other. Since the UEs transmit the signals using the different scrambling codes, the Node B can distinguish the signals received from the respective UEs.

The UE employing the USTS scheme spreads the DPDCH signal and the DPCCH signal with its unique OVSF codes and scrambles the spread DPDCH and the spread DPCCH signal with an uplink scrambling code commonly-used by the UEs in a cell where it is located, instead of using its unique scrambling code, and transmits the scrambled signals. That is, the UE employing the USTS scheme spreads DPDCH signal and the DPCCH signal with its unique OVSF code, i.e., a channelization code, assigned from the Node B. The Node B then despreads the signals received from the respective UEs using the OVSF codes uniquely assigned to the Ues and the common scrambling code, thereby distinguishing the received signals.

In addition, the W-CDMA communication system transmits the respective DL DPCH signals with different time offsets, in order to prevent the transmission power from increasing instantaneously when the Node B simultaneously transmits a plurality of downlink DPCH (DL DPCH) signals. By doing so, the uplink DPCH (UL DPCH) signals also arrive at the Node B at different points in time, preventing the Node B from simultaneously processing the signals received from a plurality of UEs, thereby distributing a load of the Node B.

FIG. 2 illustrates the timing relationship between the DL DPCH signal and the UL DPCH signal in the W-CDMA communication system, wherein it is assumed that there is no propagation delay between the Node B and the UEs, i.e., that the UE receives the DL DPCH transmitted by the Node B with no propagation delay and the Node B also receives the UP DPCH transmitted by the UE with no propagation delay. When there exists a propagation delay between the Node B and the UEs, a round trip time (RTT) must be considered. However, since the system will operate in the same manner even though there exists the propagation delay, the round trip time can be assumed to be '0' for simple explanation.

Referring to FIG. 2, one 10-ms frame is comprised of 15 slots, and each slot is comprised of 2560 chips. A common pilot channel (CPICH) signal and a primary common control physical channel (P-CCPCH) signal are frame-synchronized with each other, and used as a reference system time for other channels.

As illustrated in FIG. 2, the respective DL DPCH signals are transmitted with a time offset $\tau_{DPCH,n}$ from the P-CCPCH signal(reference system time). The respective DPCH signals are given the different time offsets $\tau_{DPCH}$. For example, each DPCH signal is given one of 0, 256, 2*256, . . . , 148*256 and 149*256-chip offsets. That is, the DPCH signal is given a time offset of a multiple of 256 chips from the reference system time.

The UE transmits the UL DPCH signal after a lapse of a $T_o$ time after receiving the DL DPCH signal with a time offset $\tau_{DPCH,n}$ from the P-CCPCH signal(reference system time). Therefore, the UL DPCH signals also have different transmission time points, so that the UL DPCH signals arrive at the Node B at the different time points. Due to a distance difference between the Node B and the respective UEs, the Node B may not receive the UL DPCH signal exactly after a lapse of the $T_o$ time after transmitting the DL DPCH signal. Therefore, the Node B measures a propagation delay time to the UE in the process of a random access channel (RACH) signal in order to measure a distance from the UE, and uses this value(propagation delay time) in predicting an expected UL DPCH signal arrival time after transmission of the DL DPCH signal.

In the USTS mode, a plurality of UEs can communicate with a Node B using the same scrambling code. The USTS scheme is designed to synchronize the UL DPCH signals received at the Node B from a plurality of UEs. In the USTS mode, the Node B assign the same scrambling code to the USTS mode UEs. Therefore, the W-CDMA communication system employing the USTS scheme can reduce the number of scrambling codes used in the cell, contributing to a reduction in interference between UE signals. When the UEs employing the USTS use the same scrambling code, the Node B can identify the UE signals using channelization codes, i.e., the OVSF codes provided from the RNC(Radio Network Controller). In the USTS mode, the RNC assigns one scrambling code for USTS UEs and assigns different OVSF codes(channelization codes) to each UEs the Node B synchronizes the UL DPCH signals from at least 2 UEs with each other, and then assigns the same scrambling code to the synchronized UEs. Further, the Node B assigns the different channelization codes (or OVSF codes) to the UL DPCHs of the UEs assigned the same scrambling code, to distinguish the received synchronized UL DPCHs.

The USTS controls a sync time of the signal through the following two processes.

(1) Initial Synchronization Process

Upon receipt of a signal from a UE over the RACH, a Node B measures the difference between a predetermined reference time and an arrival time of the signal received over the RACH. The Node B transmits the measured time difference to the UE over a forward access channel (FACH). Upon receipt of the time difference over the FACH, the UE aligns its transmission time using the received time difference.

(2) Tracking Process

The Node B transmits a time alignment bit (TAB) to the UE by periodically comparing the arrival time of the UE signal and the reference time. If the TAB is '1', the UE shifts the transmission time ahead by ⅛ chip. However, if the TAB is '0', the UE shifts the transmission time behind by ⅛ chip. The TAB is transmitted once every two frames using a transmit power control (TPC) bit in the control channel.

In the USTS mode where several UEs use the same scrambling code, the uplink frame signals transmitted by the UEs using the same scrambling code must be synchronized with one another at the Node B. That is, when the Node B receives the DPCHs transmitted from several UEs, the received DPCHs must be subjected to both slot synchronization and frame synchronization. The frame synchronization is to minimize interference among the UEs using the same scrambling code, while the slot synchronization is to distinguish the UE signals from each other. The UEs perform spreading using the different OVSF codes and perform scrambling using the same scrambling code, depending on the orthogonal property of the OVSF codes. The Initial Synchronization Process is a process for acquiring the frame synchronization and the slot synchronization.

As described above, the respective DL DPCHs have different time offsets $\tau_{DPCH,n}$. Therefore, the UL DPCHs received at the Node B are not synchronized (or misaligned) with one another. During the Initial Synchronization Process, the misalignment among the UL DPCHs is removed to synchronize the UL DPCHs. Accordingly, there is a demand for a method for resolving the channel misalignment problem in the Initial Synchronization Process.

As stated above, since the USTS synchronizes the uplink within one cell and uses the channelization codes and a specific scrambling code different from a normal DPCH not supporting the USTS service, a special handover method is required. That is, in the case of the normal DPCH, each UE uses a unique uplink scrambling code. However, in the case of the USTS, a plurality of the UEs share the same scrambling code. Further, in the case of the normal DPCH, a node position of an OVSF code for spreading the DPCCH signal is SF256 which is the highest position in the OVSF code tree. However, in the case of the USTS, the node position may be different. In addition, a node position of the OVSF code for spreading the DPDCH may also be different from the node position of the OVSF code in the OVSF code tree, used by the normal DPCH. However, in the case of the USTS, the UE performs special synchronization, so that when the handover is performed in the same method as done by the existing UMTS system, two or more connections operate differently. Therefore, it is not possible to perform a USTS handover using the existing handover method. Thus, there is a demand for a separate handover method.

In addition, there is a demand for a mode switching method for switching an operation mode of the UE to the USTS mode, when the UE, which supports the USTS service but operates in the normal mode or non-USTS mode, enters into coverage of the Node B supporting the USTS service.

SUMMARY OF THE INVENTION

It is, therefore, an object of the present invention to provide a method for performing synchronization in a CDMA communication system employing the USTS.

It is another object of the present invention to provide a method for acquiring frame synchronization and slot synchronization of UL DPCHs from UEs employing the USTS in a CDMA communication system.

It is further another object of the present invention to provide a method for performing a handover in a CDMA communication system employing the USTS.

It is yet another object of the present invention to provide a method for exchanging USTS messages for performing a handover between an RNC and UEs in a CDMA communication system employing the USTS.

It is still another object of the present invention to provide a method for maintaining synchronization between a UE and a Node B during a handover of the UE employing the USTS in a CDMA communication system.

It is still another object of the present invention to provide a method for switching an operation mode of a UE operating in a non-USTS mode to a USTS mode.

To achieve the above and other objects, there is provided a handover controlling method in an RNC connected to a first Node B and a second Node B in a mobile communication system where a USTS service occurs between the first Node B and a UE within a cell of the first Node B. The UE hands over when the UE is located in a handover area across the cell areas of the first Node B and the second Node B adjacent to the first Node B. The method comprises determining whether the handover for the UE is possible or not; transmitting handover information to the second Node B if the handover is possible, the handover information including the scrambling code of the UE, a scrambling code time offset representing the time difference between the start point of the scrambling code used for data communication between the UE and the first Node B and the start point of a uplink data frame, and a channelization code for a transmission channel of the data; and transmitting a command to the UE through the first Node B, requesting the UE to hand over to the second Node B if the RNC receives a response message for the handover information indicating that the handover is possible from the second Node B.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

An embodiment of the present invention discloses a method for synchronizing UL DPCHs transmitted from UEs which perform scrambling using the same scrambling code, in a CDMA communication system employing the USTS (Uplink Synchronous Transmission Scheme). A process necessary for initial synchronization of the UL DPCH can be divided into two processes: one is a process for synchronization in a slot unit or 256*m-chip unit (where m is an integer, for example m=1), and another is a scrambling code synchronization process.

First, the slot or 256*m-chip unit synchronization process will be described. For example, if m=1, the synchronization is performed in a unit of 256 chips.

Figure 1:
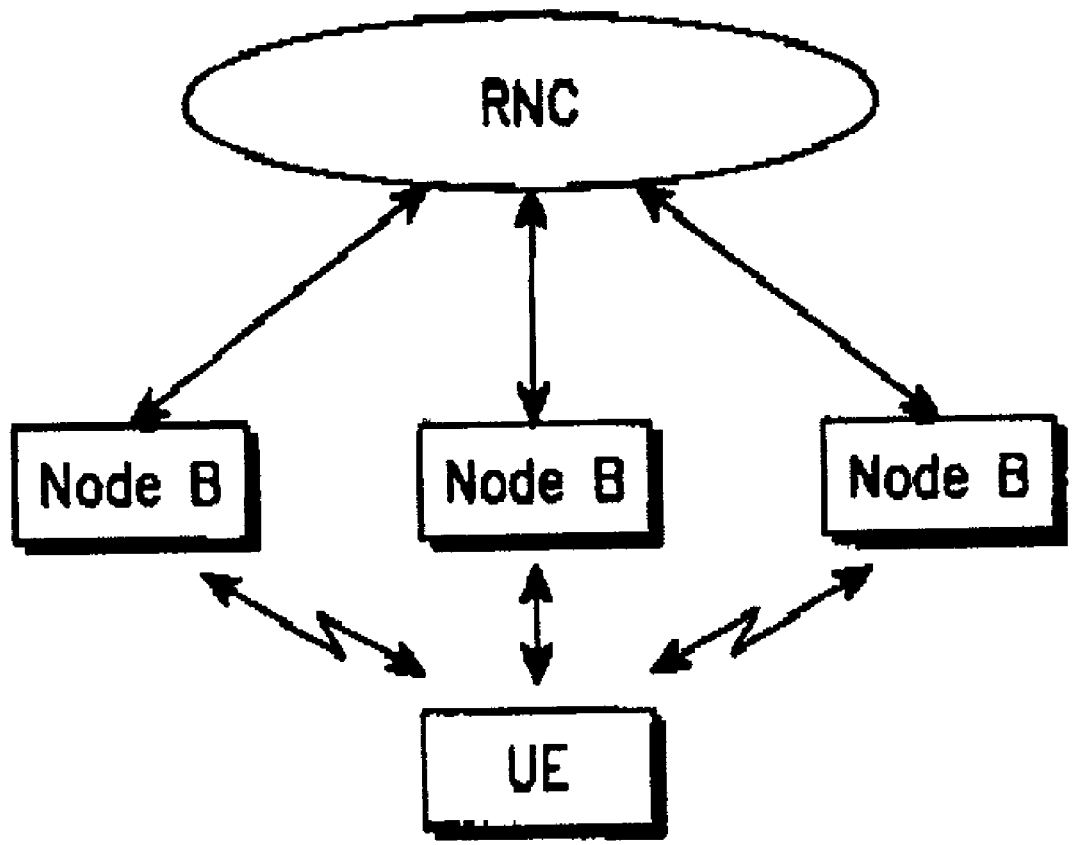
FIG. 1 is a diagram illustrating architecture of a W-CDMA communication system.
Figure 2:
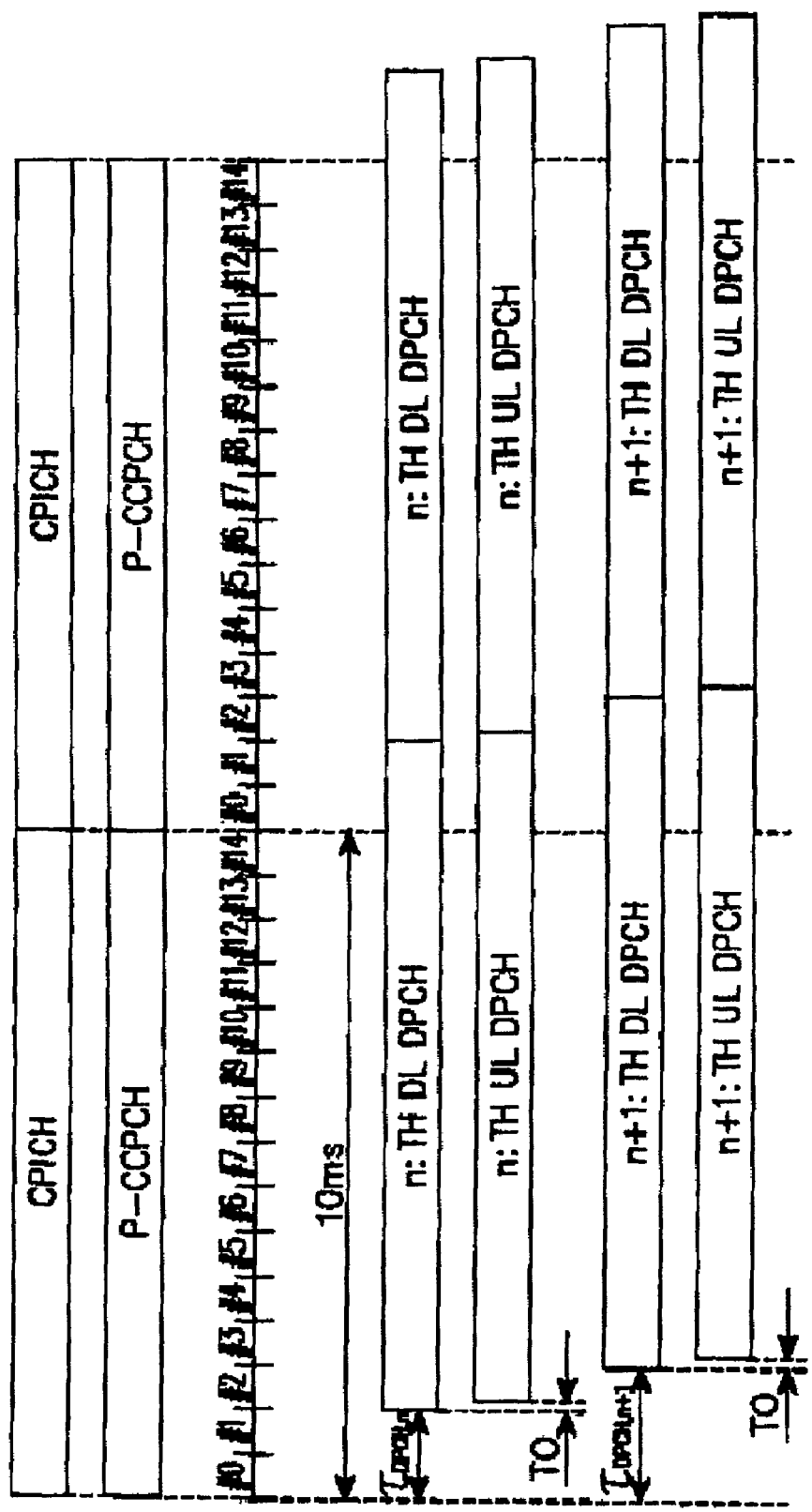
FIG. 2 is a diagram illustrating the timing relationship between a DL DPCH and an UL DPCH in the W-CDMA communication system.
Figure 3:
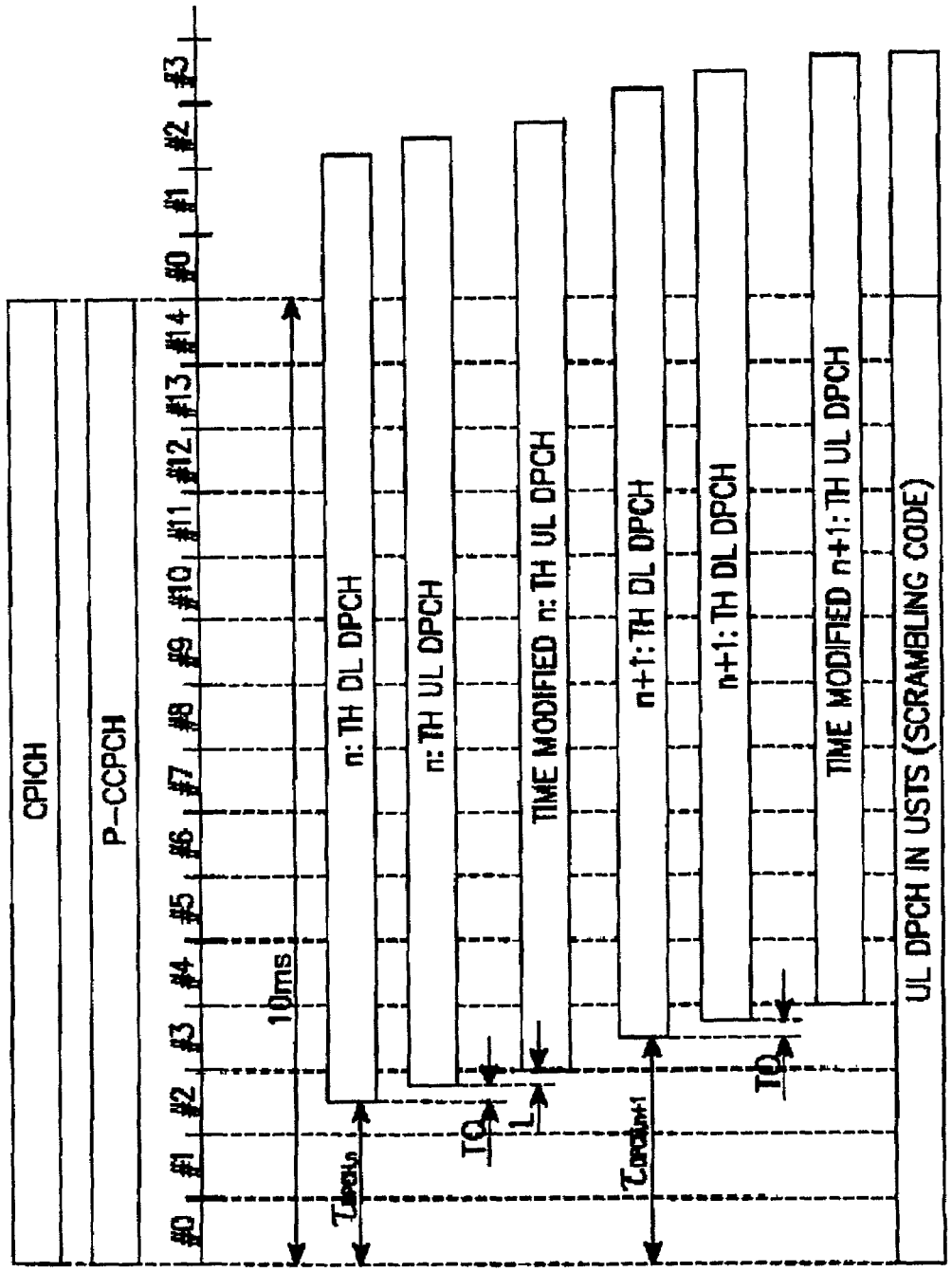
FIG. 3 is a diagram illustrating the timing relationship when synchronization is performed by a USTS according to an embodiment of the present invention.

FIG. 3 illustrates the timing relationship when synchronization is performed in a USTS mode according to an embodiment of the present invention. It is assumed that there exists no propagation delay between the Node B and the UEs, i.e., that the UE receives the DL DPCH transmitted by the Node B with no propagation delay and the Node B also receives the UP DPCH transmitted by the UE with no propagation delay. When there exists a propagation delay between the Node B and the UEs, a round trip time (RTT) must be considered. However, since the system will operate in the same manner even though there exists the propagation delay, the round trip time will be assumed to be '0'. In addition, the timing diagram of FIG. 3 can also be construed as the timing of the UEs. That is, it can be construed that the timing of the CPICH and the DL DPCH indicates a time when the UE receives the signal, and the timing of the UL DPCH and the 'Time modified UL DPCH' indicates a time when the UE transmits the signal.

Referring to FIG. 3, reference numeral 11 indicates a transmission time of the DL DPCH transmitted to an $n^{th}$ UE out of the UEs sharing a given scrambling code. The DL DPCH 11 transmitted to the $n^{th}$ UE is transmitted after delay of a time offset $\tau_{DPCH,n}$ from the transmission time of the CPICH or the P-CCPCH. The respective DPCHs have a different transmission time. Reference numeral 12 indicates a transmission time of the UL DPCH transmitted from the $n^{th}$ UE. The UE transmits the UL DPCH at time $T_o$ after receiving the DL DPCH. Therefore, the UEs have the different UL DPCH transmission time. The USTS must synchronize the UL DPCHs with one another. Therefore, when it is desired to perform communication using the USTS, a process for synchronizing the UL DPCHs is required. The embodiment of the present invention discloses a method for synchronizing the UL DPCHs transmitted from the UEs sharing the same scrambling code in the USTS mode. A method for initializing the USTS mode will be described with reference to a case of m=10.

(Step 1) Measurement of Propagation Delay (PD) from RACH Signal

Upon receipt of an RACH signal transmitted from the UE, the Node B measures a propagation delay (PD) value of the RACH signal. The measured PD value is used when the Node B assigns the DPCH.

(Step 2) Calculation of K=($\tau_{DPCH,n}$+$T_o$+2*PD) mod 2560

The Node B calculates a remainder K obtained by diving by 2560 the sum of a time offset $\tau_{DPCH,n}$ of a given DPCH, a constant $T_o$, and a value 2*PD measured in (Step 1). Here, the time offset $\tau_{DPCH,n}$ indicates a delay time (or time difference) between the P-CCPCH and the DL DPCH, and the constant $T_o$ indicates a delay time between the DL DPCH and the UL DPCH transmitted to and from the UE. Further, the PD value indicates a propagation delay value, wherein '2560' indicates the number of chips constituting one slot.

(Step 3) Transmission of L=2560−K to UE

The Node B calculates a value L using the value K, and then, transmits the calculated value L to the UE. Upon receipt of the value L, the UE transmits the UL DPCH, after the delay of the time $T_o$ plus the time L from a reception time of the DL DPCH.

Step 3 above is a process for synchronizing the UEs in a slot (=2560 chip) unit. Although the synchronization is performed in a unit of 2560-chip slot herein, it is also possible to perform the synchronization in a unit of a multiple of 256 chips in the light of the property of the OVSF codes. Performing synchronization in a unit of 2560-chip slot is an example of performing synchronization in a unit of 256*m chips where m=10. Here, the value 'm' can be either provided through a signaling message from an upper layer or previously determined. A process for performing synchronization in a unit of 256*m chips will be described below.

It (Step 1) Measurement of Propagation Delay (PD)

Upon receipt of an RACH signal transmitted from the UE, the Node B measures the propagation delay value PD of the RACH signal. It is known that the measured PD value is used when the Node B assigns the DPCH. The PD value can be calculated in a chip unit. In this case, the PD value indicates a one-way propagation delay time between the Node B and the UE.

(Step 2) Calculation of K=($\tau_{DPCH,n}$+$T_o$+2*PD) mod 256*m

The Node B calculates a remainder K obtained by dividing by 256*m the sum of a time offset $\tau_{DPCH,n}$ of a given DPCH, a constant $T_o$, and a value 2*PD measured in (Step 1).

(Step 3) Transmission of L=256*m−K to UE

The Node B calculates a value L using the value K, and then, transmits the calculated value L to the UE. Upon receipt of the value L, the UE transmits the UL DPCH, after the delay of the time $T_o$ plus the time L from a reception time of the DL DPCH.

In (Step 2), the time offset $\tau_{DPCH,n}$ is previously defined as 256*K chips, and the value $T_o$ is previously defined as 256*4 chips. Therefore, for m=1, the value K is equivalent to a remainder determined by dividing 2*PD by 256 (i.e., 2*PD mod 256). In (Step 3), the Node B can transmit the value K instead of the value L to the UE. In this case, the UE can calculate the value L from the value K, or use the intact value K.

If the K value or the L value is less than a reference value (e.g., 128), the Node B transmits K (or L) so that the UE transmits the signal as early as the value K (or 256−L). However, if the K value of the L value is larger than the reference value, the Node B transmits +K (or +L) so that the UE transmits the signal as late as the value L. Upon receipt of the value K or the value L transmitted from the Node B, the UE may also transmit the UL DPCH, at time $T_o$−K after the reception time of the DL DPCH using the received value K, rather than transmitting the UL DPCH after the delay of the time $T_o$ plus the time L from the receipt time of the DL DPCH. Therefore, upon receipt of the value L or the value K, the UE transmits the UL DPCH after calculating the value K or the value L in the above-stated method.

In the method for transmitting the K value or the L value, the Node B may set a time alignment value of the UE below 128 chips for m=1 in order to minimize the time alignment value. For example, if the K value is less than 128, the Node B directly transmits the K value to the UE. Upon receipt of the K value less than 128, the UE transmits the UL DPCH after a lapse of the $T_o$−K time from the reception time of the DL DPCH as stated above. If the K value is larger than or equal to 128, the Node B transmits the L (=256−K) value with a negative sign. Upon receipt of the L value, the UE transmits the UL DPCH after a lapse of the $T_o$+L time from the reception time of the DL DPCH.

The Node B may also transmit the PD value to the UE instead of transmitting the value L or the value K. In this case, upon receipt of the PD value transmitted from the Node B, the UE can use the received PD value in transmitting the UL DPCH considering the time offset $\tau_{DPCH,n}$ and the value $T_o$. For example, upon receipt of the PD value, the UE can transmit the UL DPCH using a value Toff which is determined by subtracting the 2*PD value from the value $T_o$ after receiving the DL DPCH. Alternatively, the UE can also transmit the UL DPCH after the further delay of a time determined by adding a common propagation delay time T_all given in the system to the time Toff.

That is, the common propagation delay time value T_all is shared by the UEs using the same cell or the same USTS scrambling code, and is defined such that the UL DPCHs received at the Node B from the UEs have a predetermined delay time. For example, the common propagation delay value T_all can be defined as a maximum propagation delay value depending upon the cell radius at the respective cells. If the UE transmits the UL DPCH after a lapse of the Toff time plus the T_all time after receiving the DL DPCH, the Node B receives the UL DPCH after a lapse of the $T_o$ time plus the T_all time after transmitting the DL DPCH to the UE. To this end, the Node B can transmit the common propagation delay value T_all and the propagation delay value PD to the UE.

In addition, the Node B can also calculate an additional delay time value T_add which will be additionally considered by the UE after the $T_o$ time considering the common propagation delay value T_all and the propagation delay value PD, and then, transmit the calculated additional delay value T_add. The additional delay value T_add can be calculated by $$T\_add = T\_all + Toff - T_o = T\_all - 2*PD$$

Therefore, the Node B transmits the T_add value to the UE, and the UE transmits the UL DPCH additionally considering the T_add value after a lapse of the $T_o$ time after receiving the DL DPCH. Therefore, the Node B can receive the UL DPCH after a lapse of the $T_0$ time plus the common propagation time T_all after transmitting the DL DPCH to the UE. In addition, the UE can calculate the K value and the L value using the propagation delay value PD transmitted by the Node B, and transmit the UL DPCH after a lapse of Toff1 (=$T_o$−L) time from the DL DPCH frame start point.

When using the T_add value, the Node B can easily receive the UL DPCH if it previously knows the T_all value. The T_all value can be given according to the cells or the USTS groups. The T_add value can be determined by the RNC and is transmitted from the RNC to the Node B so that the Node B can easily receive the UL DPCH.

Next, the scrambling code synchronization process will be described.

Reference numeral 13 of FIG. 3 indicates a transmission time of the UL DPCH of the $n^{th}$ UE, which is subjected to slot or 256-chip synchronization. Therefore, when received at the Node B, the $n^{th}$ UE's UL DPCH is slot-synchronized. A sync error caused by mobility of the UE during a time between transmission of the RACH signal and transmission of the UL DPCH can be modified by performing the tracking process.

Reference numerals 14, 15 and 16 of FIG. 3 indicate a DPCH transmission time of an $(n+1)^{th}$ UE having a different time offset $\tau_{DPCH,n+1}$. The $(n+1)^{th}$ UE also undergoes the slot synchronization in the same method as used by the $n^{th}$ UE.

In this method, it is possible to acquire the slot synchronization among the UEs sharing one scrambling code. Even though the slot synchronization is acquired, the frame synchronization may not be acquired according to the time offset $\tau_{DPCH,n+1}$. In order for the UEs in a USTS group to use one scrambling code, it is necessary to time-align (or synchronize) the scrambling codes used by the UEs.

Reference numeral 17 of FIG. 3 indicates a method for aligning the scrambling codes from the UEs. In order for the UEs belonging to the USTS group using one scrambling code to acquire synchronization of the scrambling codes at the time when the Node B receives the UL DPCH, a separate scrambling code synchronization operation is required. Here, "synchronization of the scrambling codes" means that the scrambling codes start at the same time. That is, synchronization of the scrambling codes means that a start point C(0) of the scrambling codes C(i) where i=0,1, . . . ,38399, is time aligned.

It is not possible to acquire synchronization of the scrambling codes only by the process of performing synchronization in a unit of slot or in a unit of 256*m chips. Therefore, for the synchronization of the scrambling codes, it is necessary to align the start points of the scrambling codes to a common reference time. FIG. 3 shows that for the synchronization of the scrambling codes, the frame start point of the CPICH or the P-CCPCH is used as the common reference time as represented by reference numeral 17.

When the frame start point of the CPICH or the P-CCPCH is used as the common reference time, the UEs in the USTS group start creating the scrambling codes in sync with the frame start point of the CPICH or the P-CCPCH. For example, the $n_{th}$ UE starts frame synchronization of the UL DPCH 13 at a $4^{th}$ slot Slot#3. In this case, although the $n^{th}$ UE's frame start point is the $4^{th}$ slot (i.e., Slot#3), a start point of the scrambling code is must be aligned to the first slot (Slot#0). That is, the start point of the scrambling code is not aligned with the frame start point of the UL DPCH. In the conventional method, the start point of the scrambling code is time-aligned with the frame start point of the UL DPCH. However, the embodiment of the present invention time-aligns the start point of the USTS scrambling code by separating the frame start point of the UL DPCH and the start point of the scrambling code.

The scrambling code synchronization process will be described below with reference to the $n^{th}$ UE.

According to the prior art, since the frame start point of the UL DPCH is time-aligned with the start point of the scrambling code, the $n^{th}$ UE uses the scrambling code which starts from C(0) at the $4^{th}$ slot (Slot#3). In the embodiment of the present invention, however, the frame start point of the P-CCPCH is used as the common reference time. Therefore, in order to use the scrambling code starting from C(0) at the $1^{st}$ slot (Slot#0), the $n^{th}$ UE must know a scrambling code generated at the frame start point of the UL DPCH which starts at the 4th slot (Slot#3). Since the scrambling code is comprised of 2560 chips per slot, the UE whose UL DPCH frame starts from the $4^{th}$ slot (Slot#3) uses a scrambling code starting from C(3*2560), and uses a scrambling code restarting from C(0) at the (Slot#0). That is, the UE changes the scrambling code C(i) (where i=0,1, . . . ,38399) to D(i)=C((i+3*2560) modulo 38400) (where i=0,1, . . . ,38399), and starts the scrambling code D(i) from D(0) beginning at the frame start point of the $4^{th}$ slot (Slot#3).

Therefore, each UE calculates the frame start point of the UL DPCH based on the time offset $\tau_{DPCH,n}$ and the value L, changes the scrambling code to D(i)=C((i+m*2560) modulo 38400) (where i=0,1, . . . ,38399) for the frame start point corresponding to Slot#m, and uses the scrambling code starting from D(0) beginning at the frame start point.

In the foregoing description, the common reference time is defined as the frame start point of the P-CCPCH. However, the common reference time can also be determined by the Node B and broadcast to the UE employing the USTS.

As another example of determining the common reference time, the frame start point of the UL DPCH from the first assigned UE out of the UEs in the USTS using a given scrambling code is defined as the common reference time. Referring to FIG. 3, only the $n^{th}$ UE and the $(n+1)^{th}$ UE use the given scrambling code. When the $n^{th}$ UE is first assigned the channel, the UE changes the scrambling code to $D(i)=C((i+m*2560)$ modulo 38400) (where $i=0,1,\ldots,38399$) and uses a scrambling code starting from D(0) beginning at the frame start point as the common reference time. Further, the frame start point of the $(n+1)^{th}$ UE, i.e., the $4^{th}$ slot (Slot#3) can also be defined as the scrambling code start point. Therefore, the Node B transmits to the $(n+1)^{th}$ UE this information indicating that Slot#3 is the common reference time, so that the $(n+1)^{th}$ UE acquires synchronization.

This embodiment discloses the scrambling synchronization method based on the slot synchronization. When synchronization is performed in a unit of 256*m chips, the scrambling synchronization method is as follows. In the 256*m-chip unit synchronization process, the UE determines the transmission time of the UL DPCH using the value L, the value K or the PD value. Since the UE and the Node B share the time offset value $\tau_{DPCH,n}$ and the value $T_o$, they can know how the synchronization was performed in the 256*m-chip unit, depending on the value L, the value K and the PD value. Therefore, it is possible to search the scrambling start point based on the PD value or the value L.

For example, if (1) $\tau_{DPCH,n}=256*25$ chips, (2) $T_o=256*4$ chips, (3) PD=1000 chips and (4) m=1, then the value L is calculated by $L=256-[(\tau_{DPCH,n}+T_0+PD) \bmod 256]=232$.

The UE uses the value L calculated for the 256-chip unit synchronization. That is, the UE starts transmitting the UL DPCH frame after the delay of the $T_o+L$ value from the frame start point of the received DL DPCH. Further, for the scrambling code synchronization, the UE determines a scrambling code offset using the frame start point of the received P-CCPCH and also using the PD value received from the Node B. The scrambling code offset refers to a time difference between the start point of the scrambling code designated as the reference time and the start point of the scrambling code of the current UE. That is, the UE changes the scrambling code to $D(i)=C((i+\text{offset\_sc})$ modulo 38400) (where $i=0,1,\ldots,38399$), and uses the scrambling code starting from D(0) beginning at the frame start point. The scrambling code offset value offset_sc is calculated by $$\text{offset\_sc}=\tau_{DPCH,n}+T_o+2*PD+L \quad (1)$$

As stated above, the L value in Equation (1) has the following values.

$$L=256*m-((\tau_{DPCH,n}+T_0+2*PD) \bmod 256*m) \quad (\text{Ex 1})$$

Therefore, it can be noted that the offset_sc value is a multiple of 256*m chips. The L value in Equation (1) can also be calculated by the following formula, and this is another example of the 256*m-chip unit synchronization.

$$L=-((\tau_{DPCH,n}+T_0+2*PD) \bmod 256*m) \quad (\text{Ex 2})$$

The L value can also be defined as a general value, as follows.

$$L=K-((\tau_{DPCH,n}+T_0+2*PD) \bmod 256*m) \quad (\text{Ex 3})$$

In the above formulas, the K value is a multiple of 256*m and can be determined by the Node B. In particular, when the K value is not a multiple of 256*m, new synchronization other than the 256*m-chip unit synchronization may be required. (Ex 1) corresponds to the case where the K value is 256*m chips, while (Ex 2) corresponds to the case where the K value is 0. Further, in the above formulas, every value is measured and calculated in a chip unit. However, when the values are measured and calculated in a unit of (1/k) chips, the propagation delay value PD can be precisely measured in a unit of up to (1/k) chips. In this case, 'mod 256*m' in the above formulas must be exchanged with 'mod 256*m*k'.

The offset value can be either calculated by the UE or directly provided to the UE from the Node B. In the case where the Node B directly provides the offset value to the UE, either the Node B may directly transmit the offset value or the UE may calculate the offset value using the information received from the Node B in the slot or 256*m-chip unit synchronization process. When directly transmitting the offset value, the Node B may transmit only the PD value and the L value, since the UE already knows $\tau_{DPCH,n}$ and $T_o$ depending on other information. Alternatively, the Node B defines the 2*PD+L as offset0 and transmits the defined value offset0, so that the UE can calculate the scrambling code offset value offset_{sc} depending upon the received value offset0. If the information transmitted by the Node B in the slot or 256*m-chip unit synchronization process is the L value or information based on which the L value can be calculated, the Node B may additionally transmit only the PD value.

For example, in the 256*m-chip unit synchronization process, the offset value offset_sc is calculated depending on the received T_add value in accordance with the following formula.

$$\text{offset\_sc}=\tau_{DPCH,n}+T_o+2*PD+T\_add$$

That is, T_add in the above formula serves as L in Equation (1). It is noted from the above formula that the UE needs the PD value in order to calculate offset_sc. In conclusion, for the scrambling code synchronization, the Node B either directly transmits the offset_sc to the UE or transmits the PD value to the UE through the slot or 256*m-chip unit synchronization process.

Since T_add=T_all−2*PD, 2*PD+T_add in the above formula can be replaced with T_all. Thus, offset_sc=$\tau_{DPCH,n}$+T_o+T_all. Therefore, the RNC can transmit the T_all value to the UE instead of transmitting the PD value. If the T_all value is defined as one value in each cell, the T_all value is previously transmitted to the UE through broadcasting information, i.e., cell information, so that the UE can previously know this value. In this case, it is also possible to enable the UE to use the information received through the broadcasting information, rather than directing transmitting the T_all value at the beginning of the USTS service.

A method for using the T_add value will be described below with reference to the embodiments of the present invention.

(Step 1): The Node B measures the PD value using the RACH data received from the UE and transmits the measured value to the RNC. Herein, the RNC receiving the information from the UE will be referred to as a "Serving RNC (SRNC)." Further, the UE can send a USTS service request to the SRNC.

(Step 2): Upon receipt of the USTS service request from the UE, the SRNC determines the T_add value depending upon the UE's PD value received from the Node B. In accordance with the present invention, the T_add value can be obtained using the T_all value. The T_all value may have a different value according to the cell or the USTS group, and this value can be determined by the RNC which controls the corresponding Node B. Herein, the RNC controlling the Node B will be referred to as a "Controlling RNC (CRNC)." When the SRNC is not identical to the CRNC, the RNC corresponding to the CRNC will be referred to as a "Drift RNC (DRNC)" for the corresponding UE. Therefore, if the SRNC is not identical to the CRNC, the SRNC must inquire of the DRNC about the T_all value, and the DRNC transmits the T_all value to the SRNC. A message used at this moment may be a Radio Link Setup Response message, a Radio Link Addition Response message, or a Radio Link Reconfiguration Prepare message, all of which are RNSAP messages.

Therefore, the T_add value is determined differently when the SRNC is identical to the CRNC and when they are not identical to each other.

(Case 1.1) SRNC Being Identical to CRNC

The SRNC determines the T_add value using the PD value received from the Node B and the internally determined T_all value. The SRNC transmits information necessary for the USTS service, including the T_all value, to the Node B. An NBAP message used at this moment may be a Radio Link Setup Request message or a Radio Link Reconfiguration Prepare message.

In (Case 1.1), the SRNC provides the DRNC with information about whether the UE supports the USTS service. An RNSAP message used at this moment may be a Radio Link Setup Request message or a Radio Link Reconfiguration Prepare message. Upon receipt of the message, the DRNC transmits the T_all value to the SRNC using a Response message. An RNSAP message used at this moment may be a Radio Link Setup Response message or a Radio Link Reconfiguration Ready message. At this point, the DRNC can transmit the T_all value to the Node B so that the Node B prepares to receive the UL DPCH. The DRNC also transmits the USTS-related information to the Node B. The USTS-related information may be a Radio Link Setup Request message and a Radio Link Reconfiguration Prepare message, both of which are the NBAP messages.

(Case 1.2): SRNC Not Being Identical to CRNC

The SRNC must either request the DRNC to provide the T_all value, or, the SRNC can transmit the PD value to the DRNC to receive the T_add value from the DRNC.

In (Case 1.2), the SRNC transmits the PD value to the SRNC together with information about whether it provides the USTS service. An RNSAP message used at this moment may be a Radio Link Setup Request message or a Radio Link Reconfiguration Prepare message. Upon receipt of the message, the DRNC determines the T_add value using the T_all value, and transmits the determined T_add value to the SRNC. An RNSAP message used at this moment may be a Radio Link Setup Response message or a Radio Link Reconfiguration Ready message. At this point, the DRNC transmits the T_all value to the Node B so that the Node B makes ready to receive the UL DPCH. The DRNC also transmits the USTS-related information to the Node B. The information transmitted at this moment may be a Radio Link Setup Request message and a Radio Link Reconfiguration Prepare message, both of which are NBAP messages.

(Step 3): The SRNC transmits the determined T_add value or the T_add value received from the DRNC to the UE. The transmitted T_add value is used by the UE in the slot or 256*m-chip unit synchronization operation. The SRNC transmits the PD value or the defined offset_sc value to the UE, together with the T_add value. This value is used for the scrambling code synchronization by the UE. The SRNC may transmit the T_all value instead of the PD value. Otherwise, when the T_all value is transmitted to the UE through the broadcasting information, the SRNC can omit transmitting the T_all value.

In (Step 2), upon receipt of the USTS-related information such as the T_all value, the Node B starts transmitting the DL DPCH and receiving the UL DPCH. In (Step 3), upon receipt of the USTS-related information such as the T_add value and the PD (or offset_sc) value, the UE starts receiving the DL DPCH and transmitting the UL DPCH from and to the Node B.

By using the scrambling code synchronization method, the start points of the scrambling codes from the UEs supporting the USTS service may arrive at the same point at the Node B, because the P-CCPCH is set as the common reference time.

It is also possible to align the scrambling codes in sync with the first assigned UE. In this case, it is further necessary to transmit information through an upper layer signal for scrambling code synchronization. The RNC can directly transmit the information to the UEs, for the synchronization. That is, the RNC can transmit the L value for the 256*m-chip unit synchronization and transmit synchronization information of a reference UE for the scrambling code synchronization. For example, the RNC may also directly transmit the offset_sc value.

A method for aligning the scrambling codes in sync with the first assigned UE will be described below.

The Node B sets an offset value for the UE, which is first assigned a USTS scrambling code, to '0'. That is, the first UE aligns the frame start point with the scrambling code start point instead of synchronizing a specific scrambling code for the UL DPCH. Meanwhile, when assigning the USTS channel to the scrambling code used by a plurality of UEs, a newly accessing UE receives an offset value for the scrambling code synchronization from the Node B. The received offset value can be calculated on the basis of the first assigned UE. In this case, since the respective UEs are primarily subjected to synchronization for the channelization code through the slot or 256*m-chip unit synchronization process, they can calculate the offset value in a unit of 256*m chips. Here, the channelization code is an OVSF code used for separating the channels in the CDMA system.

The above-stated synchronization process will be described with reference to FIG. 3, in which it is assumed that the $n^{th}$ UE is a UE which is first assigned the USTS scrambling code, and that m=10 in the slot or 256*m-chip unit synchronization process in the initial synchronization process. Referring to FIG. 3, the $n^{th}$ UE aligns the frame start point and the scrambling code start point to Slot#2 after acquiring slot synchronization. That is, the offset value is '0'. Similarly, the $(n+1)^{th}$ UE aligns the frame start point to Slot#3 after slot synchronization. In order to synchronize the scrambling code with the $n^{th}$ UE, the scrambling code is synchronized with an offset of one slot or 256*10 chips. That is, the scrambling code start point is aligned to Slot#2. Thereafter, an offset value for the $(n+1)^{th}$ UE becomes 256*10 chips.

Figure 4:
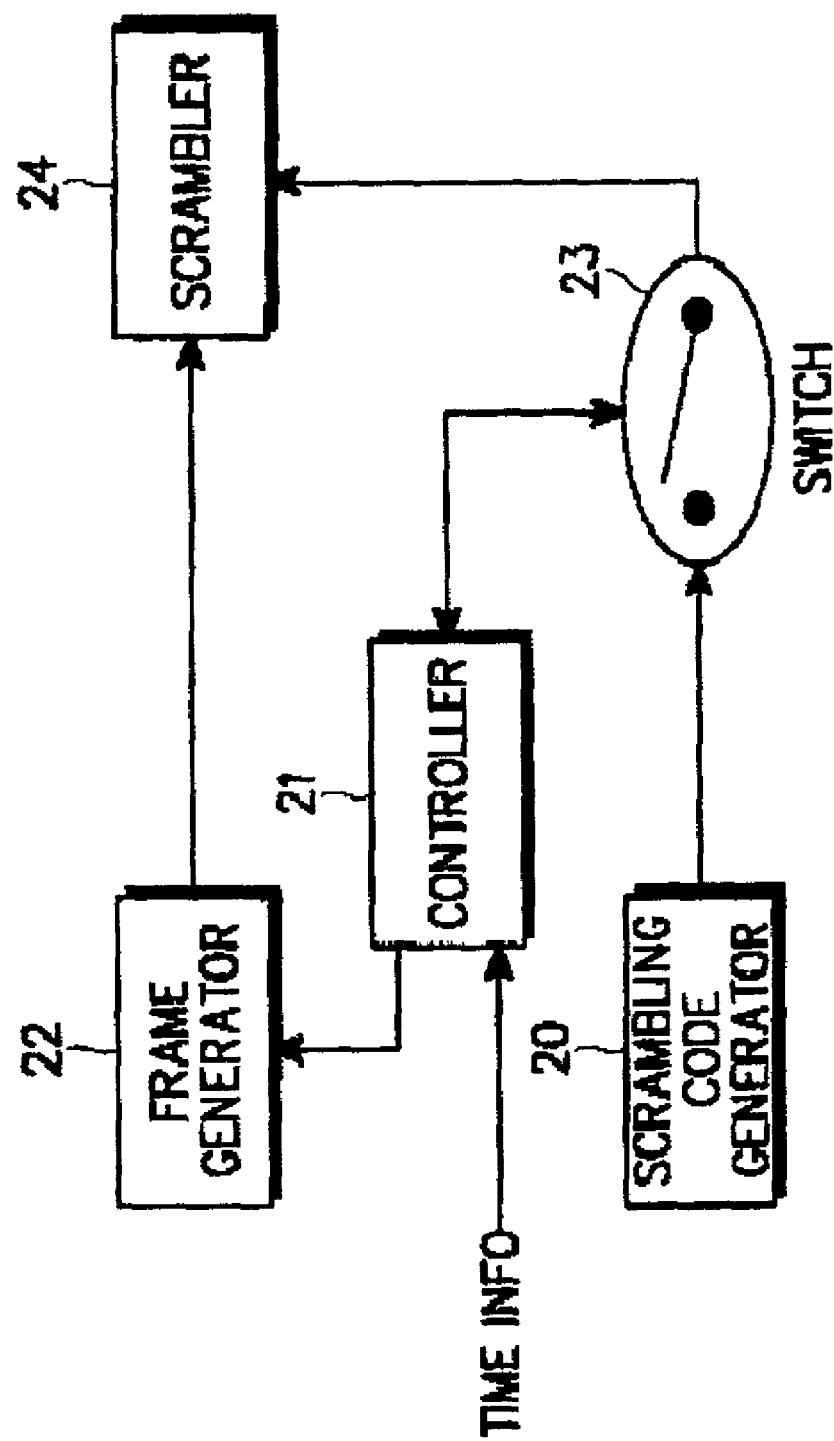
FIG. 4 is a block diagram illustrating a structure of a scrambling code synchronization apparatus for a UE according to an embodiment of the present invention.

FIG. 4 illustrates a structure of a scrambling code synchronization apparatus for the UE according to an embodiment of the present invention. Referring to FIG. 4, a scrambling code generator 20 creates a scrambling code in sync with a given common reference time. That is, when the frame start time of the P-CCPCH is defined as the common reference time, the scrambling code generator 20 creates a scrambling code starting from C(0) beginning at the first slot Slot#0 of the P-CCPCH. Alternatively, when the frame start point of the first UE is set as the common reference time, the scrambling code generator 20 creates a scrambling code starting from C(0) beginning at the slot which becomes the frame start point of the first UE. Here, the frame start point of the P-CCPCH received by the UE is set on condition that the propagation delay value PD is 0. However, when the propagation delay value PD is not 0 in an actual situation, the UE creates the scrambling code starting from C(0) beginning at the frame start point of the P-CCPCH, which is shifted ahead by 2*PD chips.

A controller 21 receives time information about the frame start point from the upper layer. The frame start point is calculated based on the time offset value $\tau_{DPCH,n}$ and the PD value. For example, in FIG. 3, the frame start point of the UE transmitting the $n_{th}$ DPCH becomes Slot#3, and the frame start point of the UE transmitting the $(n+1)^{th}$ DPCH becomes Slot#4. The controller 21 transmits the frame start point information to a frame generator 22 and a switch 23 based on the time information, so as to control the UE to start transmitting the UL DPCH. Upon receipt of the frame start point information from the controller 21, the frame generator 22 starts creating the frame at a given time and transmits the created frame to a scrambler 24. Upon receipt of the frame start point information from the controller 21, the switch 23 transmits the scrambling code created by the scrambling code generator 20 to the scrambler 24. The scrambler 24 spreads the frame received from the frame generator 22 using the scrambling code received from the scrambling code generator 20. As a result, the DPCH frame is scrambled with the scrambling code generated beginning at a time point of $2*PD+\tau_{DPCH,n}+T_o+T\_add$. That is, the DPCH frame is scrambled with the scrambling code starting from $C(2*PD+\tau_{DPCH,n}+T_o+T\_add)$.

In operation of the scrambling code synchronization apparatus, the controller 21 drives the frame generator 22 at the frame start point in order to create the data frame to be transmitted over the DPCH. Further, the controller 21 turns ON the switch 23 at the frame start point so as to provide the scrambling code created by the scrambling code generator 20 to the scrambler 24. The scrambling code generator 20 can create the scrambling code in sync with the frame start point of the CPICH or the P-CCPCH. In this case, since the scrambling code is provided to the scrambler 24 beginning at the frame start point of the DPCH, the scrambling code created at the frame start point of the DPCH may not be identical to C(0). That is, when the frame start point of the DPCH starts at the $3^{rd}$ slot, the DPCH data frame is spread with the scrambling code created at the $3^{rd}$ slot. In addition, if the scrambling code generator 20 generates the scrambling code in sync with the frame start point of the first UE in the USTS group, to which the DPCH is assigned, instead of creating the scrambling code at the frame start point of the CPICH or the P-CCPCH, the controller 21 controls a time point for creating the scrambling code. The succeeding operation is identical to that described above.

By using the scrambling code synchronization apparatus, it is possible to transmit the frame in sync with a given time offset by using the scrambling code time-aligned with the common reference time during transmission of UL DPCH of the USTS.

The scrambling code synchronization method according to the present invention acquires slot synchronization of the UEs in the USTS group and aligns the start points of the scrambling codes. Therefore, it is possible to reduce interference thanks to the time alignment of the scrambling codes and identify information from the UEs through the channelization code (e.g., OVSF code) by slot synchronization.

The handover type of the UE employing the USTS in the mobile communication system supporting the USTS service can be divided into one case where a new cell, i.e., a target handover cell provides a USTS handover and another case where the new cell does not provide the USTS handover.

First, an operation of the system will be described with reference to the case where the new cell provides the USTS handover. When the new cell, a target cell to which the UE is to be handed over, provides the USTS handover, it is possible to perform a handover to the new cell while maintaining the USTS service in the current cell. For the communication service on the UE in the new cell, it is possible to use either the USTS service or a normal communication service, i.e., a data service in which a normal DPCH not supporting the USTS service is assigned. In order to set up a new radio link in the new cell while maintaining the USTS service in the current cell, the SRNC transmits the following information to the Node B and the RNC corresponding to the new cell, as shown in FIGS. 5 to 8:

(1) UL scrambling code for the UE employing the USTS (USTS scrambling code)

(2) information on UL DPDCH and UL DPCCH channelization codes for the UE employing the USTS (USTS CH code NO)

(3) indicator indicating that the UE is employing the USTS (USTS indicator)

(4) scrambling code time offset information (USTS offset)

Figure 5:
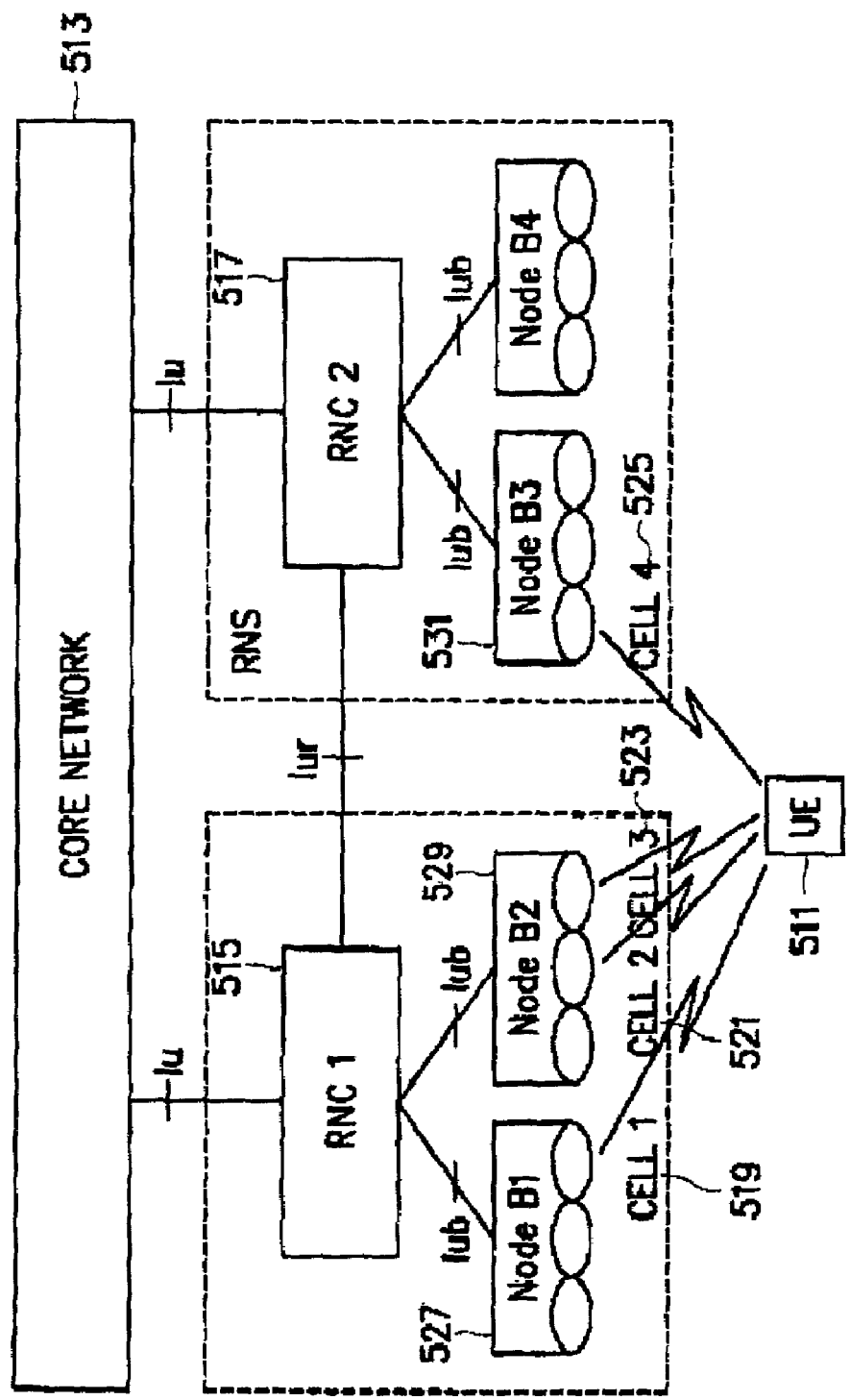
FIG. 5 is a diagram illustrating a structure of a UTRAN in a W-CDMA mobile communication system according to an embodiment of the present invention.

FIG. 5 illustrates a structure of a UTRAN in a W-CDMA mobile communication system, wherein a UE 511 is connected to the UTRAN. Referring to FIG. 5, a first RNC 515 connecting the UE 511 to a core network is called a "Serving RNC (SRNC)", while a second RNC 517 assisting a connection to the SRNC 515 is called a "Drift RNC (DRNC)." FIG. 5 shows a state where the UE 511 sets up radio links to first to fourth cells 519, 521, 523 and 525. In this state, it is said that "the UE 511 exists in a handover area" or "the UE 511 is in a handover state". The first cell 519 having a radio link connected to the UE 511 exists in a first Node B 527, the second and third cells 521 and 523 exist in a second Node B 529, and the fourth cell 525 exists in a third Node B 531.

Figure 6:
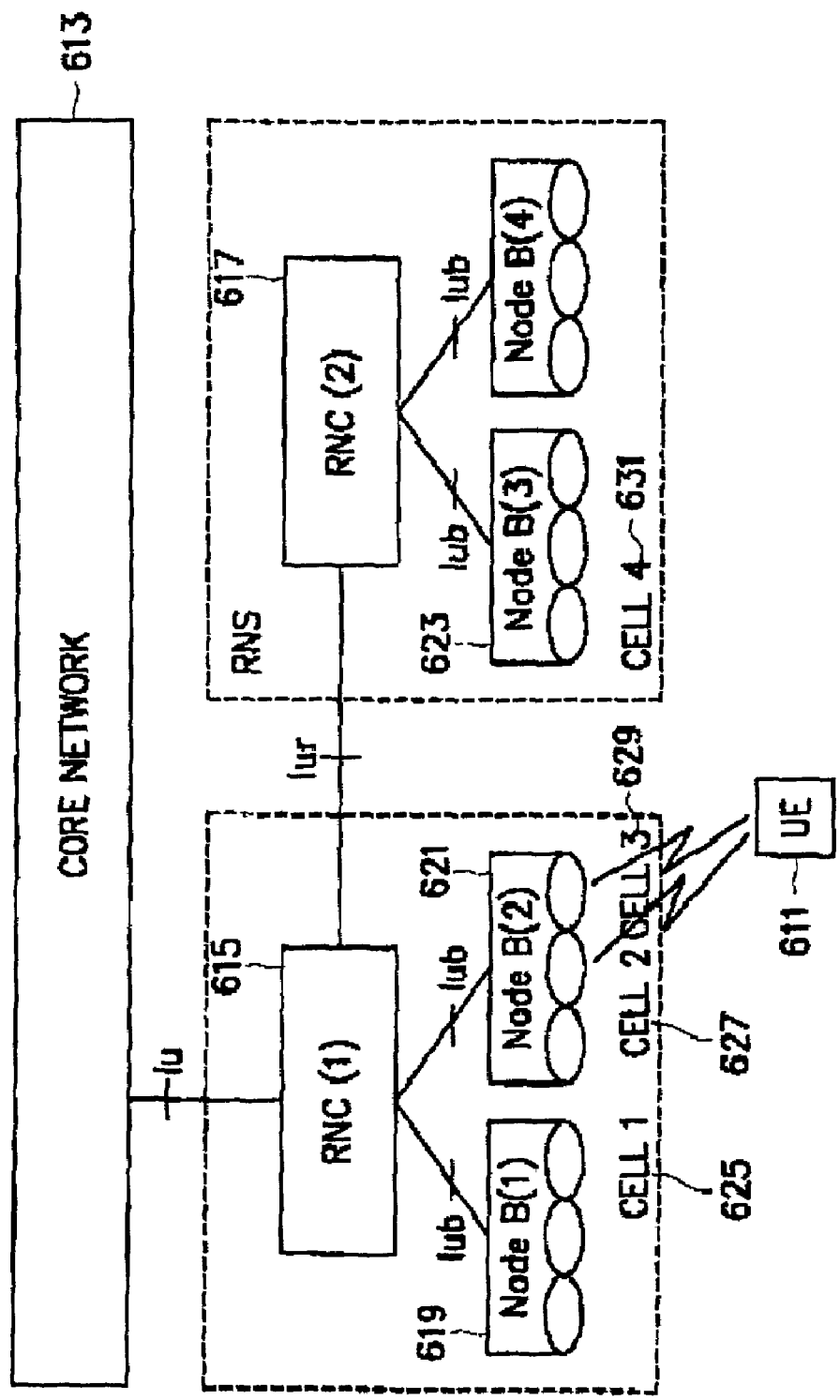
FIG. 6 is a diagram illustrating a structure of a UTRAN in a W-CDMA mobile communication system according to another embodiment of the present invention, wherein a handover of a UE is performed within the same Node B.

FIG. 6 illustrates a structure of a UTRAN in a W-CDMA mobile communication system, wherein a handover of a UE is performed within the same Node B according to another embodiment of the present invention. Referring to FIG. 6, a UE 611 performs an operation of setting up a new radio link to a third cell 629 in a second Node B 621, while maintaining a radio link connected to a second cell 627 in the same Node B 621. For the handover performed within the same Node B, the following message is required. Upon receipt of information on a basic measurement value for the handover from the UE 611, a first RNC (SRNC) 615 determines to perform a handover and then transmits an NBAP (Node B Application Part) message to the second Node B 621 through a Iub interface. The transmitted NBAP message is a Radio Link Addition Request message for setting up a new radio link.

Figure 9:
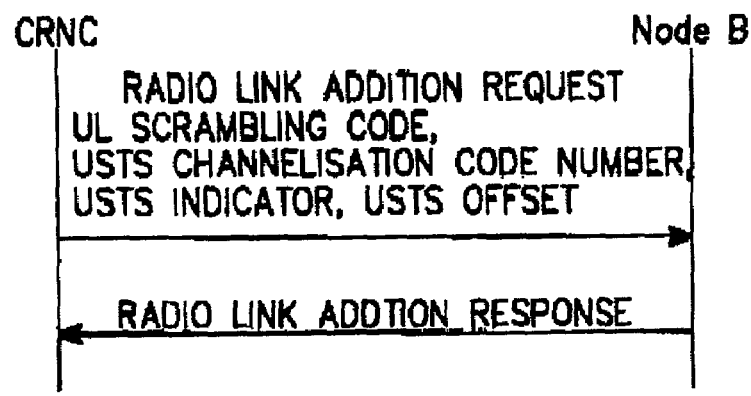
FIG. 9 is a flow diagram illustrating a process for transmitting a Radio Link Addition Request message to another cell in the same Node B during a USTS handover according to another embodiment of the present invention.

FIG. 9 illustrates a process for transmitting a Radio Link Addition Request message to another cell in the same Node B during a USTS handover according to another embodiment of the present invention. Referring to FIG. 9, the Radio Link Addition Request message includes separate parameters for the USTS handover in addition to the handover parameters. The parameters for the USTS handover are shown in Table 1 below, which will be described later. Upon receipt of the parameter information for the USTS handover, the second node B 621 sets up a new radio link to the UE 611 and exchanges data through the new radio link.

Figure 7:
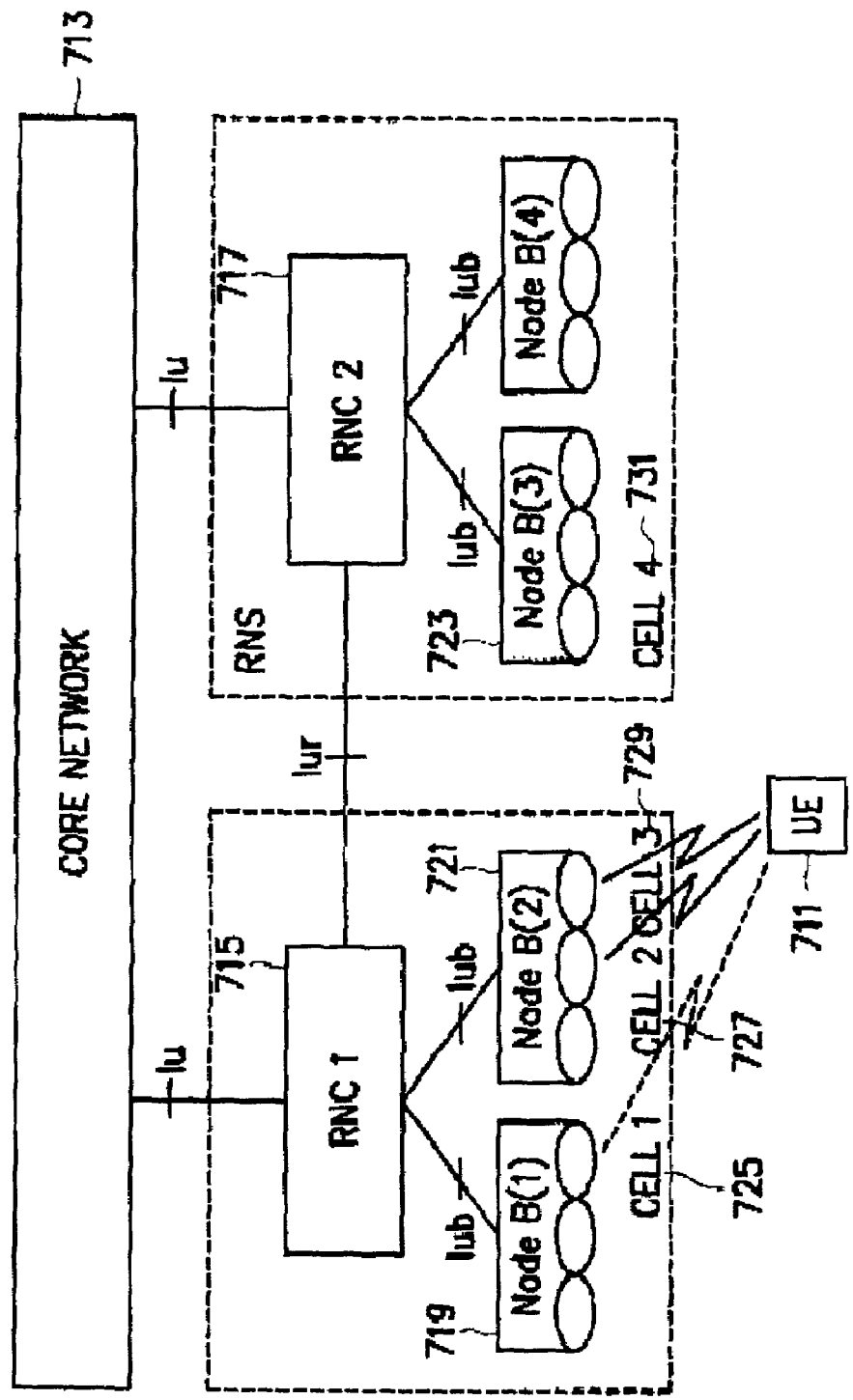
FIG. 7 is a diagram illustrating a structure of a UTRAN in a W-CDMA mobile communication system according to another embodiment of the present invention, wherein a handover of a UE is performed to another Node B within the same RNC.

FIG. 7 illustrates a structure of a UTRAN in a W-CDMA mobile communication system, wherein a handover of a UE is performed to another Node B within the same RNC according to another embodiment of the present invention. Referring to FIG. 7, a UE 711 performs an operation of setting up a new radio link to a first cell 725 in a first Node B 719, while maintaining radio links connected to second and third cells 727 and 729 in a second Node B 721. For the handover performed to another Node B within the same RNC, the following message is required. Upon receipt of information on a basic measurement value for the handover from the UE 711, a first RNC (SRNC) 715 determines to perform a handover and then transmits an NBAP message to the first Node B 719 through a Iub interface. The transmitted NBAP message is a Radio Link Setup Request message.

Figure 10:
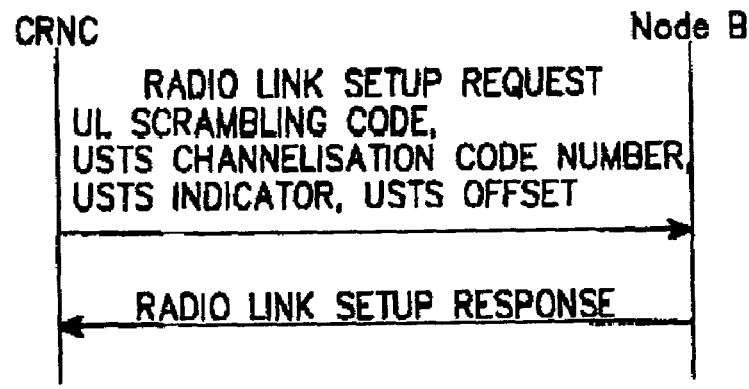
FIG. 10 is a flow diagram illustrating a process for transmitting a Radio Link Setup Request message to another Node B within the same RNC during a USTS handover according to another embodiment of the present invention.

FIG. 10 illustrates a process for transmitting a Radio Link Setup Request message to another Node B within the same RNC during a USTS handover according to another embodiment of the present invention. Referring to FIG. 10, the Radio Link Setup Request message includes separate parameters for the USTS handover in addition to the handover parameters. The parameters for the USTS handover are shown in Table 1, which will be described later. Upon receipt of the parameter information for the USTS handover, the first node B 719 sets up a new radio link to the UE 711 and exchanges data through the new radio link.

Figure 8:
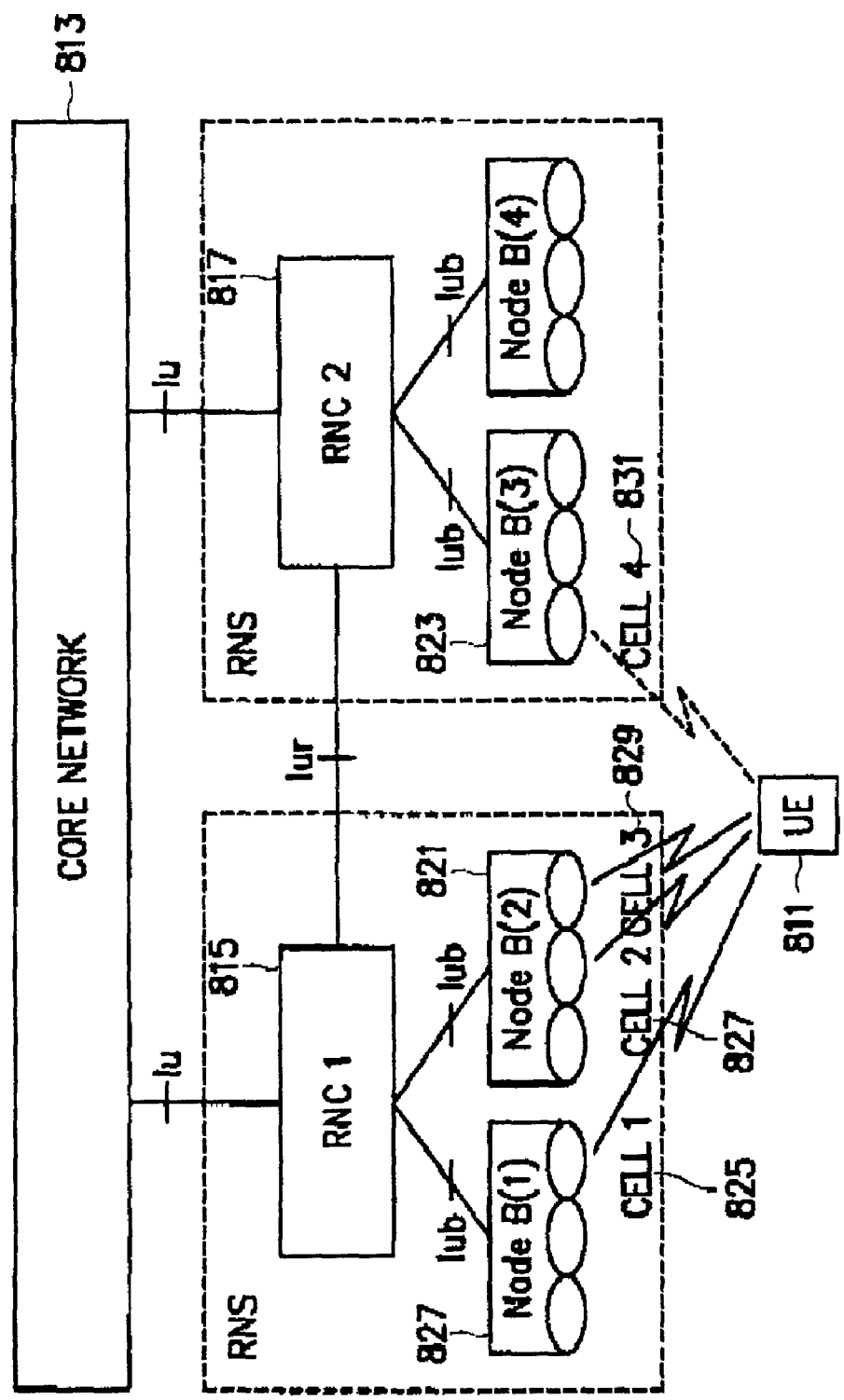
FIG. 8 is a diagram illustrating a structure of a UTRAN in a W-CDMA mobile communication system according to another embodiment of the present invention, wherein a handover of a UE is performed to a cell within another RNC.

FIG. 8 illustrates a structure of a UTRAN in a W-CDMA mobile communication system, wherein a handover of a UE is performed to a cell within another RNC according to another embodiment of the present invention. Referring to FIG. 8, a UE 811 performs an operation of setting up a new radio link to a fourth cell 831 in a second RNC 817, while maintaining radio links connected to first, second and third cells 825, 827 and 829 in a first RNC 815. For the handover performed to a cell within another RNC, the following message is required. Upon receipt of information on a basic measurement value for the handover from the UE 811, the first RNC (SRNC) 815 determines to perform a handover and then transmits an RNSAP (RNS Application Part) message to the second RNC 817 through a Iub interface. The transmitted RNSAP message is a Radio Link Setup Request message.

Figure 11:
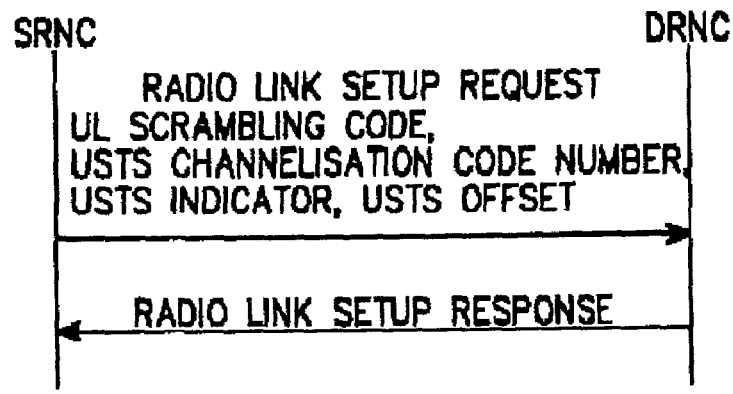
FIG. 11 is a flow diagram illustrating a process for transmitting a Radio Link Setup Request message to a cell in another RNC during a USTS handover according to another embodiment of the present invention.

FIG. 11 illustrates a process for transmitting a Radio Link Setup Request message to a cell in another RNC during a USTS handover according to another embodiment of the present invention. Referring to FIG. 11, the Radio Link Setup Request message includes separate parameters for the USTS handover in addition to the handover parameters. The parameters for the USTS handover are shown in Table 1, which will be described later. Upon receipt of the parameter information for the USTS handover, a fourth Node B 831 sets up a new radio link to the UE 811 and exchanges data through the new radio link.

In sum, when the handover is performed as shown in FIGS. 6 and 9, the RNC performs a process for creating, at a handoff request, a Radio Link Addition Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Addition Request message to the Node B, and a process for performing a handover upon receipt of a Radio Link Addition Response message from the Node B and servicing the handover channel in the USTS mode.

Further, the Node B performs a process for receiving from the RNC the Radio Link Addition Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Addition Response message to the RNC upon receipt of the Radio Link Addition Request message, assigning a handover channel according to the received channelization code information, setting a frame start point at a scrambling code start point according to the scrambling code time offset information, and performing a handover at the set frame start point.

In addition, when the handover is performed as shown in FIGS. 7 and 10, the RNC performs a process for creating, at a handoff request, a Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Setup Request message to another Node B, and a process for performing a handover upon receipt of a Radio Link Setup Response message from another Node B and servicing the handover channel in the USTS mode.

Further, the Node B performs a process for receiving from the RNC the Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Setup Response message to the RNC upon receipt of the Radio Link Setup Request message, assigning a handover channel according to the received channelization code information, setting a frame start point at a scrambling code start point according to the scrambling code time offset information, and performing a handover at the set frame start point.

Next, when the handover is performed as shown in FIGS. 8 and 11, a first RNC performs a process for creating, at a handoff request, a Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Setup Request message to a second RNC to which the UE is to be handed over, and a process for performing a handover upon receipt of a Radio Link Setup Response message from the second RNC and performing the handover at a set time.

Further, the Node B performs a process for receiving from the first RNC the Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Setup Response message to the first RNC upon receipt of the Radio Link- Setup Request message and transmitting the USTS parameters to the corresponding Node B, so that the Node B can assign a handover channel according to the received channelization code information, sets a frame start point at a scrambling code start point according to the scrambling code time offset information, and perform a handover at the set frame start point.

Tables 1 to 3 below show various formats of the Radio Link Setup Request message of the NBAP message, in which the USTS parameters are inserted. It is also possible to transmit the USTS parameters using the similar format even for the Radio Link Setup Request message of the RNSAP message and the Radio Link Addition Request message of the NBAP message.

Specifically, Table 1 corresponds to a case where one UE uses only one DPDCH, and Tables 2 and 3 correspond to a case where one UE can have a plurality of DPDCHs. It is assumed in Table 2 that unlink the normal DPDCH, the UE can have a plurality of channelization codes even though SF is not 4, and the channelization codes have the same SF. Further, it is assumed in Table 3 that unlink the normal DPDCH, the UE can have a plurality of channelization codes even though SF is not 4, and the channelization codes have the different SFs.

In Tables 1 to 3, USTS Indicator indicates that the US is employing the USTS, and USTS Channelization Code Number indicates information (USTS CH code NO) on the channelization code numbers for the UL DPDCH and the UL DPCCH of the UE employing the USTS. In addition, USTS offset indicates the scrambling code time offset information. Further, UL Scrambling Code indicates a UL scrambling code of the UE employing the USTS, and for this, the existing message information, i.e., the UL scrambling code information is used.

Table 1 shows a format of the Radio Link Setup Request (or Radio Link Addition Request) message for the USTS handover according to an embodiment of the present invention, wherein one UE uses only one DPDCH.

TABLE 1

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | reject |
| CRNC Communication Context ID | M | | 9.2.1.18 | | YES | reject |
| Transaction ID | M | | 9.2.1.62 | | | |
| UL DPCH Information | | 1 | | | YES | reject |
| >UL Scrambling Code | M | | 9.2.2.59 | | | |
| >Min UL Channelisation Code length | M | | 9.2.2.22 | | | |
| >Max Number of UL DPDCHs | C CodeLen | | 9.2.2.21 | | | |
| >puncture limit | M | | 9.2.1.50 | for UL | | |
| >TFCS | M | | 9.2.1.58 | for UL | | |
| >UL DPCCH Slot Format | M | | 9.2.2.57 | | | |
| >UL SIR Target | M | | UL SIR 9.2.2.58 | | | |
| >Diversity mode | M | | 9.2.29 | | | |
| >D Field Length | C FB | | 9.2.2.5 | | | |
| >SSDT cell ID Length | O | | 9.2.2.45 | | | |
| >S Field Length | O | | 9.2.2.40 | | | |
| >USTS INdicator | O | | | | | |
| >USTS Channelisation Code Number | CUSTS | | | | | |
| -Omitted- | | | | | | |
| RL Information | | 1 to <maxnoofRLs> | | | EACH | notify |
| >RL ID | M | | 9.21.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diversity Control Field | C NotFirstRL | | 9.2.2.7 | | | |
| >USTS offset | | | | | | |
| -Omitted- | | | | | | |

In Table 1, USTS Channelization Code Number (USTS CH code NO) indicates a corresponding number in the OVSF code tree for a given SF in Min UL Channelization Code Length. For example, if SF=4, the USTS Channelization Code Number has one of the values 0, 1, 2 and 3. The USTS Channelization Code Number of 0 indicates the highest code node in the OVSF code tree, the USTS Channelization Code Number of 1 indicates the second highest code node in the OVSF code tree, the USTS Channelization a Code Number of 2 indicates the third highest code node in the OVSF code tree, and the USTS Channelization Code Number of 3 indicates the lowest code node in the OVSF code tree. In Table 1, the USTS Channelization Code Number is marked with 'C USTS' in a Presence column, since this information is necessary only for the USTS handover. This indicates that the USTS Channelization Code Number is Conditional information which is required only for the USTS service or required only when there exists the USTS Indicator.

In Table 1, USTS offset indicates the scrambling code time offset information. The new cell can approximately synchronize the uplink and the downlink for the UE using a Frame Offset value and a Chip Offset value transmitted from the SRNC. However, the UE employing the USTS does not align the scrambling code start point with the frame start point during transmission of the UL DPCH, so that the new cell must receive the scrambling code time offset information in order to search the scrambling code start point.

The scrambling code time offset value can be defined as a value which is created when the UE employing the USTS sets an offset by separating the scrambling code start point from the frame start point in order to align the UL scrambling codes to the UEs using the same scrambling code. As a result, upon receipt of the scrambling code time offset, the new cell can search the start point of the scrambling code for the UL DPCH depending on the received scrambling code time offset. For example, the scrambling code time offset can be used for the offset value in Table 1.

Table 2 shows a format of the Radio Link Setup Request (or Radio Link Addition Request) message in the W-CDMA mobile communication system supporting the USTS service according to another embodiment of the present invention, wherein one UE uses a plurality of DPDCHs and the same SF.

USTS channelization code number which can be repeated as many times as the number of channels assigned to one group and are required every time. Therefore, in Table 2, the USTS Channelization Code Number (USTS CH code NO) indicates a corresponding number in the OVSF code tree for a given SF in Min UL Channelization Code Length. For example, if SF=8, the USTS Channelization Code Number has some of the values 0,1, . . . ,7. Max Number of UL DPDCHs is removable from Table 2.

Table 3 shows a format of the Radio Link Setup Request (or Radio Link Addition Request) message in the W-CDMA mobile communication system supporting the USTS service

TABLE 2

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | reject |
| CRNC Communication Context ID | M | | 9.2.1.18 | | YES | reject |
| Transaction ID | M | | 9.2.1.62 | | | |
| UL DPCH Information | | 1 | | | YES | reject |
| >UL Scrambling Code | M | | 9.2.2.59 | | | |
| >Min UL Channelisation Code length | M | | 9.2.2.22 | | | |
| >Max Number of UL DPDCHs (Removable) -Omitted- | C CodeLen | | 9.2.2.21 | | | |
| >USTS Indicator | O | | | | | |
| >USTS Channelisation Code Information | CUSTS | 1 to <maxnoofCH> | | | | |
| >>USTS Channelisation Code Number -Omitted- | M | | | | | |
| RL Information | | 1 to <maxnoofRLs> | | | EACH | notify |
| >RL ID | M | | 9.2.1.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diversity Control Field | C NotFirstRL | | 9.2.2.7 | | | |
| >USTS offset -Omitted- | C USTS | | | | | |

Table 2 corresponds to a case where a plurality of channelization code nodes are used for one SF. Therefore, in Table 2, USTS Channelization Code Information indicates a according to another embodiment of the present invention, wherein one UE uses a plurality of DPDCHs and the different SFs.

TABLE 3

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 8.2.1.46 | | YES | Reject |
| CRNC Communication Context ID | M | | 9.2.1.18 | | YES | Reject |
| Transaction ID | M | | 9.2.1.62 | | | |
| UL DPCH Information | | 1 | | | YES | Reject |
| >UL Scrambling Code | M | | 9.2.2.59 | | | |
| >Min UL Channelisation Code length (Removable) | M | | 9.2.2.22 | | | |
| >Max Number of UL DPDCHs (Removable) -Omitted- | C CodeLen | | 9.2.2.21 | | | |
| >USTS Indicator | O | | | | | |
| >USTS Channelisation Code Information | C USTS | 1 to <maxnoofCH> | | | | |

TABLE 3-continued

| IE/Group Name | Presence | Range | IE type and reference | Semantics description | Criticality | Assigned Criticality |
|---|---|---|---|---|---|---|
| >Min UL Channelisation Code length | M | | | | | |
| >>USTS Channelisation Code Number | M | | | | | |
| -Omitted- | | | | | | |
| RL Information | | 1 to <maxnoofRLs> | | | EACH | notify |
| >RL ID | M | | 9.2.1.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diverstiy Control Field | C NotFirstRL | | 9.2.2.7 | | | |
| >USTS offset | C USTS | | | | | |
| -Omitted- | | | | | | |

Table 3 corresponds to a case where a plurality of channelization code nodes are used for several SFs. In this case, Min UL Channelization Code Length and Max Number of UL DPDCHs are removable from Table 3. In Table 3, USTS Channelization Code Information indicates Min UL Channelization Code Length for SF information and a USTS channelization code number, which can be repeated as many times as the number of channels assigned to one group and are required every time. Therefore, in Table 3, the Min UL Channelization Code Length can have one of the values 4, 8, 16, 32, 64, 128 and 256. In each case, the USTS Channelization Code Number indicates a corresponding number in the OVSF code tree for a given SF in Min UL Channelization Code Length.

For example, if SF=8, the USTS Channelization Code Number has some of the values 0,1, . . . ,7.

It is assumed in Tables 1 to 3 that the channelization code for the UL DPCCH is not notified with separate information. That is, it is possible not to notify the separate information by previously determining a specific rule between the DPDCH and the DPCCH such that a specially mapped SF=256 channelization code node should be used for the DPCCH, when a certain OVSF code node is assigned to the channelization code for the DPDCH. Of course, when the channelization code node to be used for the DPCCH is not previously designated, information indicating the channelization code node for the DPCCH must be additionally inserted in the above tables. Since the SF=256 channelization code node is always used for the DPCCH, it is necessary to notify information about which of SF=0 to SF=254 code nodes is to be used.

Meanwhile, the UL scrambling code of a UE operated based on USTS can be transmitted in the same form as information transmitted on a typical DPCH. Because the UL scrambling code is for USTS in the cell, a new cell to which the UE hands over a call must know the USTS scrambling code beforehand. USTS scrambling codes are known in many ways.

(1) The first way is to transmit the USTS indicator. A cell receiving the USTS indicator (a corresponding Node B or RNC) recognizes the UE uses USTS and a different handover from that on a typical DPCH is required.

(2) Some of UL scrambling codes are preset for USTS in the same manner as saving of the UL scrambling codes for RACHs or CPCHs. Then, the SRNC transmits the UL scrambling codes for USTS to the Node B or RNC so that the Node B or RNC can recognize that the UE uses the USTS.

(3) The third way relies on presence or absence of channelization code information. If there exists information about the scrambling code and DPCCH channelization code of the UE using the USTS, this implies that it can be determined the handover UE uses the USTS. It is because such channelization code information is different from that for a typical DPCH.

Once the UE succeeds in establishing a new radio link, it can continue the USTS service in one cell and perform a general DPCH or USTS service in other cells. If this procedure is repeated, there may exist the case where one UE is connected to one cell by a USTS service and to at least one other cell on a DPCH. In this case, the UE collectively receives data from the plurality of cells as one piece of information. The cell, with which the UE communicates for the USTS service, may utilize part of TPC information for a different use, that is, as a TAB (Time Alignment Bit) for tracking. Accordingly, the UE needs to recognize the TAB separately from the information received from the cells.

Now, the operations of each UE, the SRNC, and the Node B for a handover of a UE using the USTS will be described below.

The UE transmits UL data while maintaining the USTS service. That is, the UE establishes a new radio link while maintaining the USTS service where a scrambling code start point can differ from a frame start point, i.e., the start point of an uplink data frame, and then receives data from different cells collectively as one piece of information. Since the cell connected to the UE by the USTS service may use part of TPC information as a TAB for tracking, the UE interprets the TAB separately from TPC information received from the other cells. Thus, the UE maintains tracking for the USTS using the TAB from the USTS-connected cell, and neglects TPC information received from the other cells at the same time point or uses it for power control.

A description of the SRNC will be given below with reference to FIG. 12.

Figure 12:
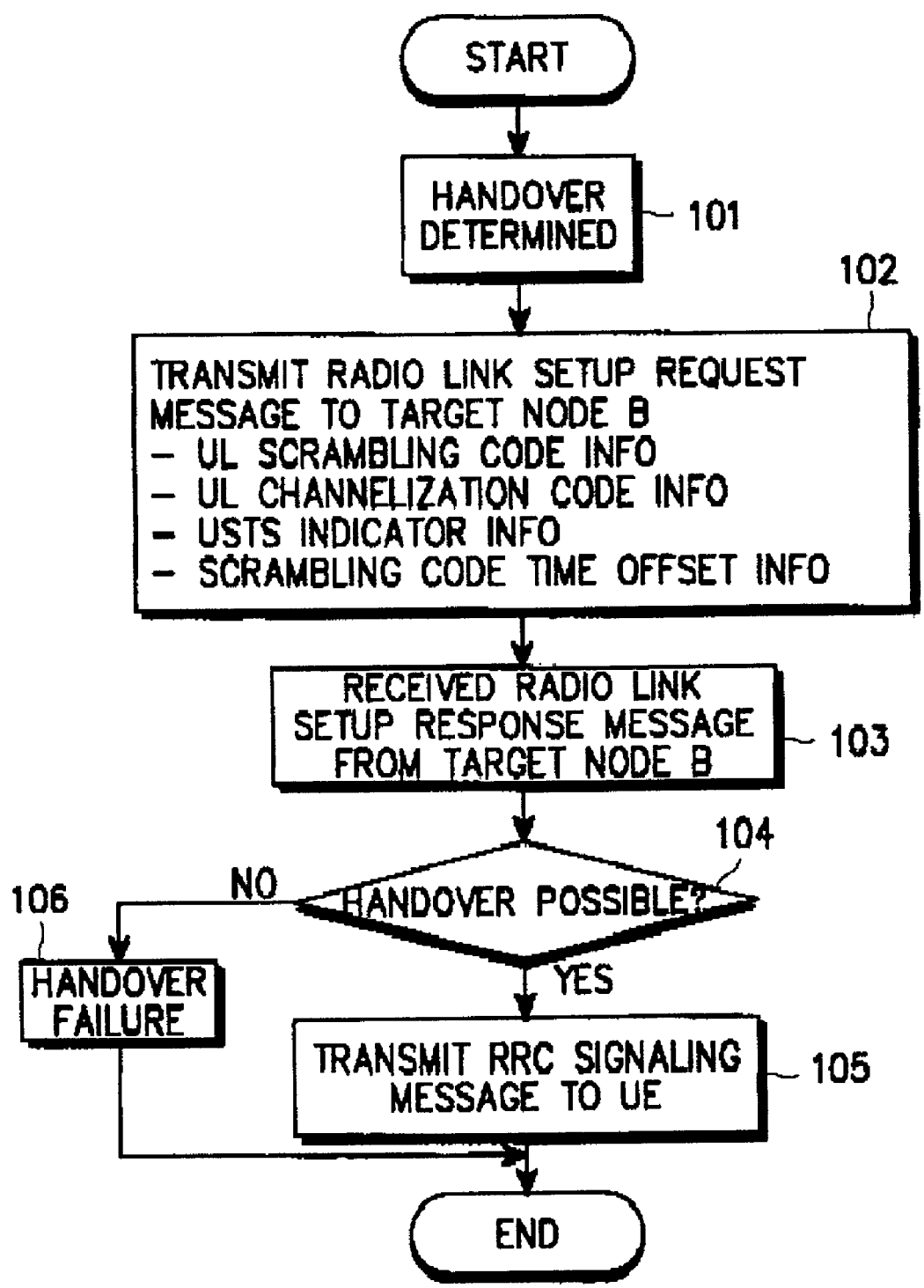
FIG. 12 is a flowchart illustrating the operation of a Serving RNC (SRNC) during a handover according to the present invention.

FIG. 12 is a flowchart illustrating the operation of the SRNC during a handover. In step 101, the SRNC receives a measurement report from the UE and determines a handover for the UE. The SRNC transmits a Radio Link Setup Request message to the Node B of a new cell in step 102. The Radio Link Setup Request message includes USTS parameters for a USTS handover. The USTS parameters are the UL scrambling code information, the UL channelization code information, the USTS indicator information, and the scrambling code time offset information. The USTS parameters, information about the UE using the USTS, are stored in the SRNC. In step 103, the SRNC receives a Radio Link Setup Response message from the target Node B in response to the Radio Link Setup Request message. The SRNC determines whether the handover is possible by analyzing the Radio Link Setup Response message in step 104. If the USTS handover is possible, the SRNC goes to step 105, and otherwise, the SRNC goes to step 106.

It can be determine that the USTS handover is impossible in step 104 in the following cases: (1) the target Node B does not support the USTS; (2) although the target Node B supports the USTS, it does not support the USTS handover; or (3) the USTS handover fails as in the conventional technology. In step 105, the SRNC transmits an RRC signaling message to the UE for handover. Here, the RRC signaling message is an Active Set Update message containing the same contents as a message transmitted during a handover in the conventional technology. Meanwhile, the SRNC ends the procedure with the USTS maintained, considering the handover is failed in step 106.

In the above description of the USTS handover, it is assumed that the SRNC is identical to a CRNC and the new cell is in a different Node B. If the new cell is in the same Node B, the Radio Link Setup Response message is replaced by a Radio Link Addition Request message in the case of FIG. 6. On the other hand, if the SRNC is different from the CRNC, that is, the UE is connected to the SRNC via a DRNC, the SRNC transmits the USTS parameters to the target Node B via the DRNC in step 102. Here, the Radio Link Setup Response message being an RNSAP message is used between the SRNC and the DRNC. The DRNC transmits the USTS parameters by a Radio Link Setup Response message being an NBAP message to the target Node B.

Figure 13:
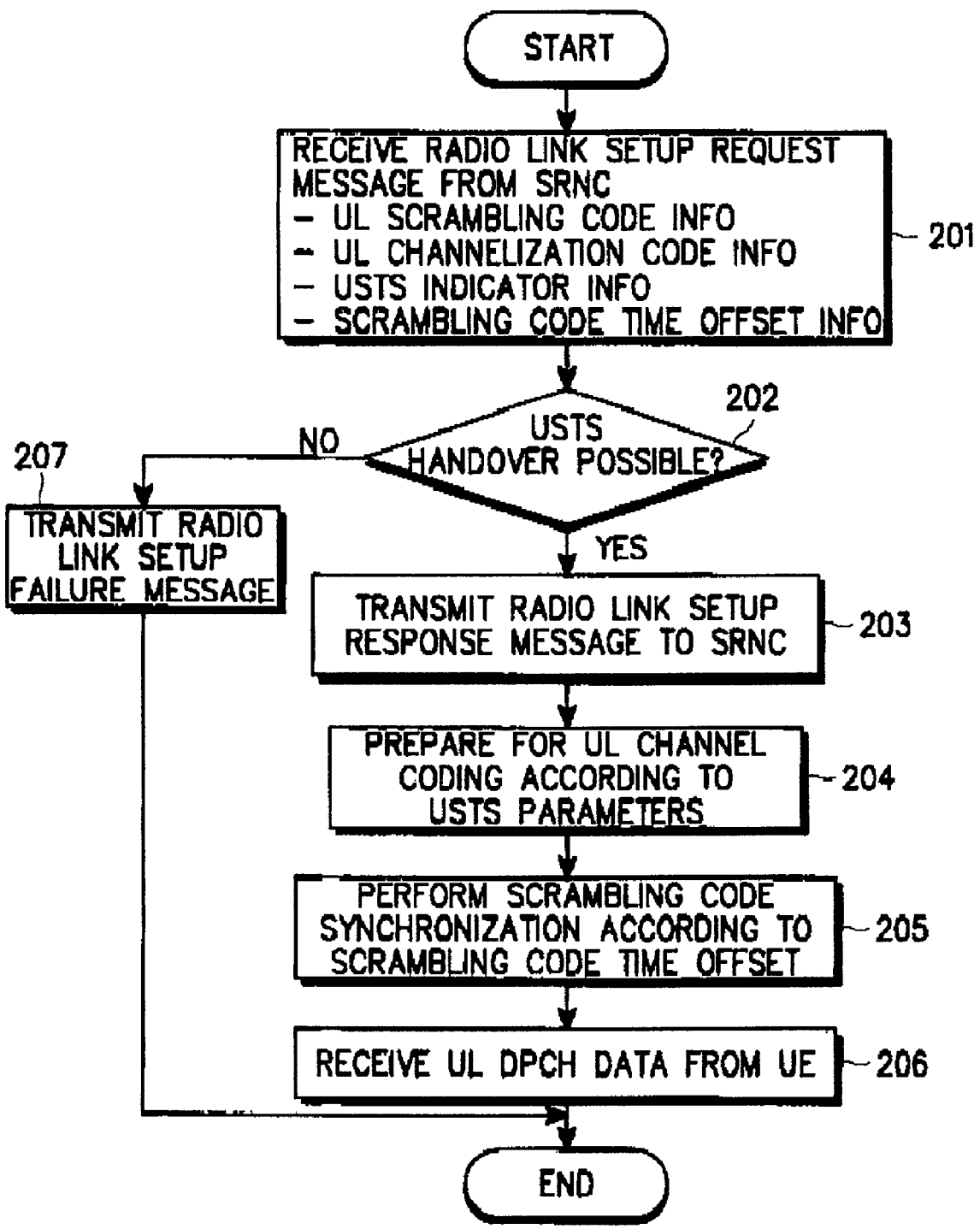
FIG. 13 is a flowchart illustrating the operation of the Node B in a new cell for the handover according to the present invention.

Referring to FIG. 13, the operation of the Node B will be described.

FIG. 13 is a flowchart illustrating the operation of the Node B in a new cell for the handover. In step 201, the target Node B receiving the handover request receives a handover-related message from the SRNC in step 201. It is assumed herein that the new cell is in a different Node B from that of the UE. Therefore, the handover-related message is an NBAP message, a Radio Link Setup Response message. On the other hand, if the new cell is in the same Node B, the handover-related message is a Radio Link Addition Request message. The Radio Link Setup Response message includes the USTS parameters, that is, the UL scrambling code information, UL channelization code information, USTS indicator information, and scrambling code time offset information, as stated before.

In step 202, the target Node B determines whether the USTS handover is possible. That is, upon receipt of the Radio Link Setup Response message, the target Node B determines whether it will support the USTS handover. If the USTS handover is impossible, the target Node B transmits a Radio Link Setup Failure message to the SRNC in step 207 and ends the procedure.

If the handover is possible in step 202, the target Node B transmits the Radio Link Setup Response message to the SRNC in response to the received Radio Link Setup Request message in step 203 and prepares for UL channel coding according to the USTS parameters set in the received Radio Link Setup Response message in step 204. In step 205, the target Node B performs scrambling code synchronization by the difference between a frame start point and a scrambling code start point according to the scrambling code time offset. Specifically, the target Node B shifts the scrambling code from the frame start point by the scrambling code time offset for synchronization of scrambling codes to thereby prepare for spreading. In step 206, the target Node B receives the UL DPCH data from the UE using the results prepared in steps 204 and 205 and ends the procedure.

In the description of the handover operation of the target Node B, the target Node B knows that the UE is receiving the USTS service from the cell of a different Node B or the cell of the same Node B. Therefore, the target Node B can also recognize that the UE continues synchronization by tracking at every frame according to the USTS service. To synchronize at a frame level, the UE can transmit UL data on a 1/n chip basis and thus it operates suitably. Or the fact that the UE may not respond to the last TPC value can be utilized.

In another embodiment of the present invention, conversion (or switching) from a typical DPCH connection state (i.e., a normal mode or a non-USTS mode) to a USTS mode will be described.

If the SRNC determines that the UE operating in the USTS mode becomes remote from the cell providing the USTS service, it discontinues the USTS service and uses the typical DPCH, or performs the USTS operation in a cell with the highest signal strength. The USTS operation is a Radio Link Reconfiguration procedure. Here, the SRNC determines from a measurement received from the UE that the UE is moving outside of the USTS service-providing cell. The mode conversion covers conversion of a USTS mode, a normal mode, and a non-USTS mode.

By the Radio Link Reconfiguration procedure, the SRNC terminates the USTS mode of the UE and transitions the UE to a normal mode or a non-USTS mode, or vice versa. Both conversions may occur simultaneously.

The normal mode refers to assignment of a typical DPCH to the UE. The non-USTS mode, used discriminatively from the normal mode, occurs to a UE which being requested to establish a radio link with a new cell due to its mobility in the USTS mode, is connected to other cells by typical DPCHs, while maintaining the USTS service with the current serving cell.

For conversion from the normal mode to the USTS mode, information set in the Radio Link Setup message or the Radio Link Addition message is transmitted by the Radio Link Reconfiguration message. When the UE requesting conversion to the USTS mode is connected to a new cell by handover, the UE and the new cell can be connected on typical DPCHs. If the UE is released from the connection to the old UTST service providing cell, the UE receives a general DPCH service. If the new cell is capable of providing the USTS service, the SRNC can convert the normal mode to the USTS mode again by the Radio Link Reconfiguration procedure.

Mode conversions of the UE will be described hereinbelow. Two cases can occur to a UE receiving the USTS service from a cell on a radio link. The one is that the UE becomes the first to be assigned to a USTS scrambling code, and the other is that the UE is assigned to a scrambling code while a USTS scrambling code is in use for other UEs for the USTS service.

As to the former case, (1) the SRNC transmits information about UL scrambling codes for USTS and UL DPDCH and DPCCH channelization code information, that is, USTS parameters to the Node B. The USTS parameters are transmitted by a Radio Link Reconfiguration message or another signaling message. (2) The Node B transmits time information measured on the radio link established with the SRNC. The time information is one of the time difference between the start point of a current received UE frame and that of a P-CCPCH frame, a value required to make the time difference is 256 chips×m, and a PD. The PD is calculated by subtracting $T_0$ from the difference between the start points of a corresponding DP DPCH frame and a UL DPCH frame. (3) The SRNC transmits time information received from the Node B to the UE. (4) the UE transmits on the uplink for USTS using the time information.

In the case whether the UE is the first to be assigned to a USTS scrambling code, the UE, the SRNC, and the Node B operate in the following as compared to the conventional ones.

The UE requests conversion to the USTS mode to the Node B during communicating on a DPCH, or the Node B attempts conversion to the USTS mode for the UE that is placed in a normal mode or a non-USTS mode after the USTS mode.

The UE transmits UL DPCH data based on a time offset for USTS in the information received from the SRNC for conversion to the USTS mode. If the time offset is 0, the UE performs the conventional DPCH operation. On the contrary, if the time offset is not 0, the UE performs synchronization by the time offset. The time offset is information required to make the difference between the start points of a current received UE frame and a P-CCPCH frame be 256 chips×m, that is, time information representing how much earlier or later the UE should transmit a UL DPCH with respect to the previous UL DPCH, or information about a PD generated during transmission of a UL DPCH. Upon receipt of the PD, the UE transmits the UL DPCH earlier by the PD.

The SRNC determines the time offset, and the UE receiving the time offset transmits the UL DPCH earlier or later by the time offset. If the UE is the first one to transition to the USTS mode, that is, there is no UE receiving the USTS service, the UE becomes a reference for the other UEs. If a USTS scrambling code is synchronized based on a P-CCPCH, the UE can perform scrambling code synchronization. In this case, the SRNC transmits time information for the scrambling code synchronization and the UE, upon receipt of the time information, delays the scrambling code by the time offset prior to transmission. The scrambling code synchronization is performed by the UE scrambling code synchronizer shown in FIG. 4.

Now the operation of the SRNC will be described with reference to FIG. 14.

Figure 14:
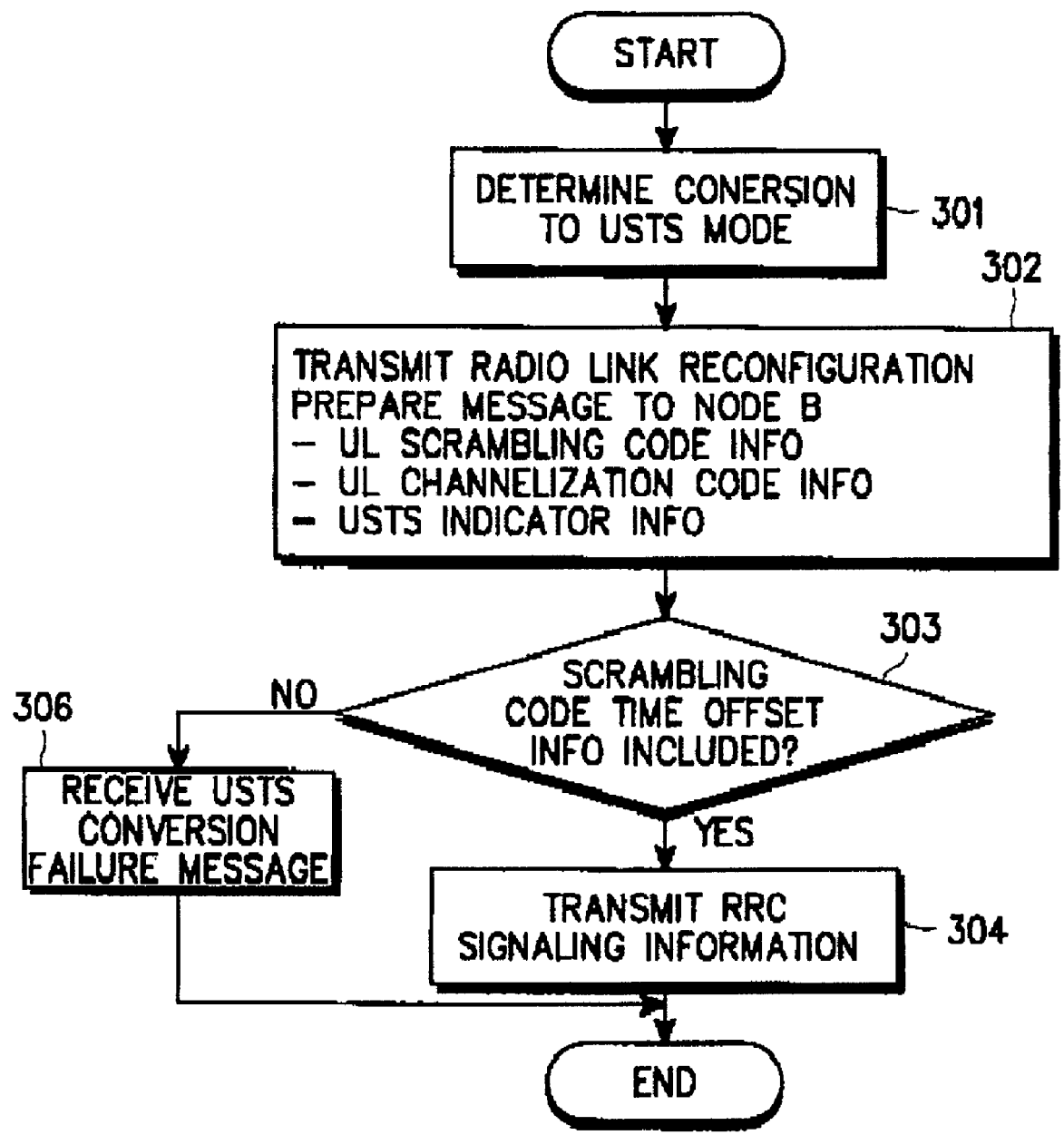
FIG. 14 is a flowchart illustrating the operation of the SRNC when the UE is transitioned to the USTS mode during communication on a DPCH according to the present invention.

FIG. 14 is a flowchart illustrating the operation of the SRNC when the UE is transitioned to the USTS mode during communication on a DPCH. Referring to FIG. 14, the SRNC determines conversion to the USTS mode for the UE communicating on the DPCH according to a measurement report received from the UE in step 301. Conversion to the USTS mode can be determined upon request from the UE. In step 302, the SRNC transmits a Radio Link Reconfiguration Prepare message to the Node B of a corresponding cell in step 302. The Radio Link Reconfiguration Prepare message includes USTS parameters. The USTS parameters are information about a UL scrambling code, a UL channelization code, and a USTS indicator. The USTS parameters are determined by the SRNC. The operation of FIG. 14 is described on the premise that the SRNC is identical to a CRNC. If the SRNC is different from the CRNC, the SRNC transmits the above information to a DRNC and the DRNC transmits the received information to the Node B. If the SRNC is different from the DRNC, the SRNC transmits only the USTS indicator information to the DRNC. Then, the DRNC determines a UL scrambling code and a UL channelization code for USTS and transmits the codes to the Node B and the SRNC. If the SRNC can determine a scrambling code time offset in step 302, the SRNC transmits the determined scrambling code time offset together with USTS parameters to the Node B. For example, if the SRNC receives the PD and an RTT from the Node B through a measurement procedure, it can determine the scrambling code time offset. Time information about 256×m basis synchronization and scrambling code synchronization can be added to the scrambling code time offset information.

In step 303, the SRNC determines whether to transition the UE to the USTS mode by analyzing a message received from the Node B. Specifically, the SRNC determines whether a Radio Link Reconfiguration Response message including the scrambling code time offset has been received from the corresponding Node B. If the received message is not the Radio Link Reconfiguration Response message, the SRNC goes to step 306. If the received message is not the Radio Link Reconfiguration Response message, it is then a USTS conversion failure message indicating the failure of the Radio Link Reconfiguration Prepare message. In step 306, the SRNC determines that it is impossible to transition the UE to the USTS mode by the USTS conversion failure message. The USTS conversion is failed when the Node B does not support the USTS, or in the failure cases as described according to the conventional technology.

Meanwhile, if the SRNC receives the Radio Link Reconfiguration Response message from Node B in step 303, the SRNC analyses the scrambling code time offset information for USTS set in the Radio Link Reconfiguration Response message in step 304. The Radio Link Reconfiguration Response message may include the scrambling code time offset itself, or the time difference between the start point of a current received UE frame and that of a P-CCPCH frame, a value required to make the time difference be 256 chips×m, and a PD. The PD is the mean value ½ of the value calculated by subtracting $T_0$ from the difference from the start points of a corresponding DL DPCH and the UL DPCH. In addition, the Radio Link Reconfiguration Response message may include a plurality of pieces of information at the same time. While it is assumed in FIG. 14 that the SRNC is identical to the CRNC, if the SRNC is different from the CRNC, the SRNC receives the above information from the DRNC and the DRNC receives the information from the Node B. The PD in the information can be obtained from the Node B using a measurement procedure instead of receiving during the USTS mode conversion. The PD can be a value resulting from the measurement procedure or from a predefined RRT. The RRT is defined as the difference between the start points of a corresponding DL DPCH and a UL DPCH. From the RRT, the PD (=$(RTT-T_0)/1$) is obtained.

After analyzing the Radio Link Reconfiguration Response message, the SRNC transmits an RRC signaling message to the UE to transition to the USTS mode and then ends the procedure. A Radio Bearer Reconfiguration Prepare message, for example, is used as the RRC signaling message. The SRNC transmits time information and channel information of the UE received from the Node B, including the UL scrambling code, the UL channelization code, the USTS indicator, and the time offset by the RRC signaling message.

Finally, a description of the Node B during the USTS mode conversion will be given with reference to FIG. 15.

Figure 15:
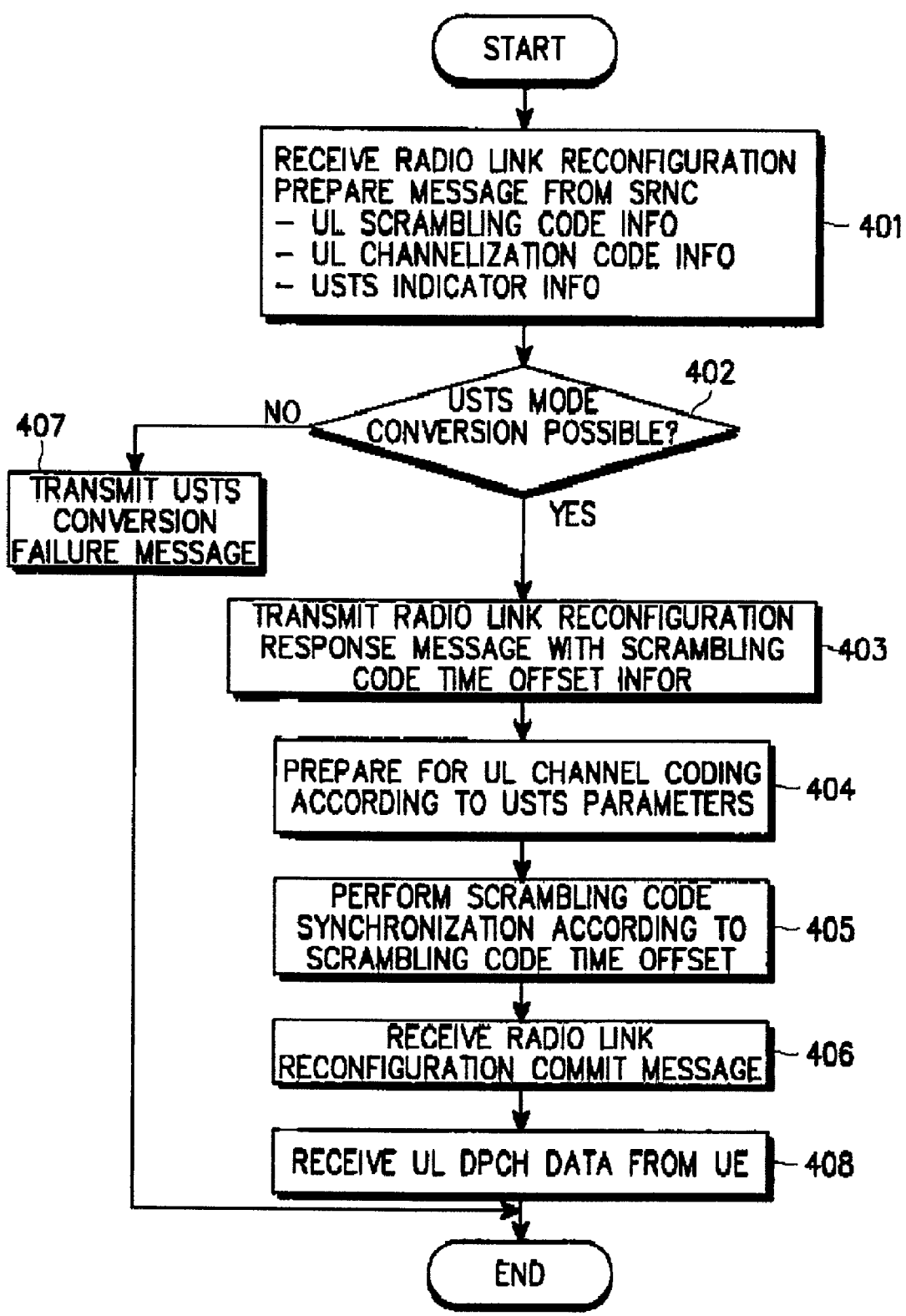
FIG. 15 is a flowchart illustrating the operation of the Node B when the UE communicating on a DPCH transitions to the USTS mode according to the present invention.

FIG. 15 is a flowchart illustrating the operation of the Node B when the UE communicating on a DPCH transitions to the USTS mode. Referring to FIG. 15, the Node B receives a USTS mode-related message from the SRNC in step 401. An NBPA message for the USTS mode conversion is, for example, the Radio Link Reconfiguration Prepare message. The received Radio Link Reconfiguration Prepare message includes information required for conversion to the USTS mode, inclusive of the UL scrambling code, the UL channelization code, and the USTS indicator.

In step 402, the Node B determines whether it is possible to transition to the USTS mode. If the USTS mode conversion is possible, the Node B goes to step 403. if the USTS mode conversion is impossible, the Node B goes to step 407.

In step 407, the Node B transmits the Radio Link Reconfiguration Failure message to the SRNC and ends the procedure.

On the other hand, if the USTS mode conversion is possible, the Node B transmits the Radio Link Reconfiguration Response message with the scrambling code time offset information to the SRNC in step 403. The Radio Link Reconfiguration Response message may include the scrambling code time offset itself, or the time difference between the start point of a current received UE frame and that of a P-CCPCH frame, a value required to make the time difference equal to 256 chips×m, and a PD. If the Node B has transmitted the PD or a related RTT to the SRNC beforehand by the measurement procedure, the SRNC may determine time information for a 256×m basis synchronization or scrambling code synchronization and transmit the time information to the Node B. In this case, there is no need to add the time information to the Radio Link Reconfiguration Response message and the Node B can obtain information about the reception time of a UL DPCH based on the time information received from the SRNC. Here, the time information can be T_all or T_add in the present invention.

The Node B prepares UL channel coding according to the scrambling code, the UL channelization code, and the USTS indicator in step 404. That is, the Node B checks the UL scrambling code and the DPDCH and DPCCH channelization codes and prepares them. In step 405, the Node B implements the scrambling code synchronization by determining the difference between a frame start point and a scrambling code start point according to the scrambling code time offset information. The Node B shifts the scrambling code by the scrambling code time offset from the frame start point and then prepares for spreading. If the UE is the first one to use a USTS scrambling code, the scrambling code time offset is 0 and the frame start point can be rendered identical to the scrambling code start point. However, if the USTS scrambling code synchronization is based on a P-CCPCH, even if the UE is the first one to use the USTS scrambling code, the scrambling code time offset may not be 0. In this case, the Node B delays the scrambling code by the scrambling code time offset and prepares to receive a UL DPCH. The scrambling code synchronization can be performed in a scrambling code synchronizer in the Node B that is symmetrical in structure to its counterpart shown in FIG. 4. The scrambling code synchronizer in the Node B will be described later.

The Node B receives a Radio Link Reconfiguration Commit message acknowledging the USTS mode conversion from the SRNC. The Radio Link Reconfiguration Commit message has time information for the USTS mode conversion and the Node B prepares to receive a UL signal at a time indicated by the time information. In step 408, the Node B receives UL DPCH data from the UE transitioned to the USTS mode and ends the procedure.

The structure of the aforementioned scrambling code synchronizer will be described with reference to FIG. 16.

Figure 16:
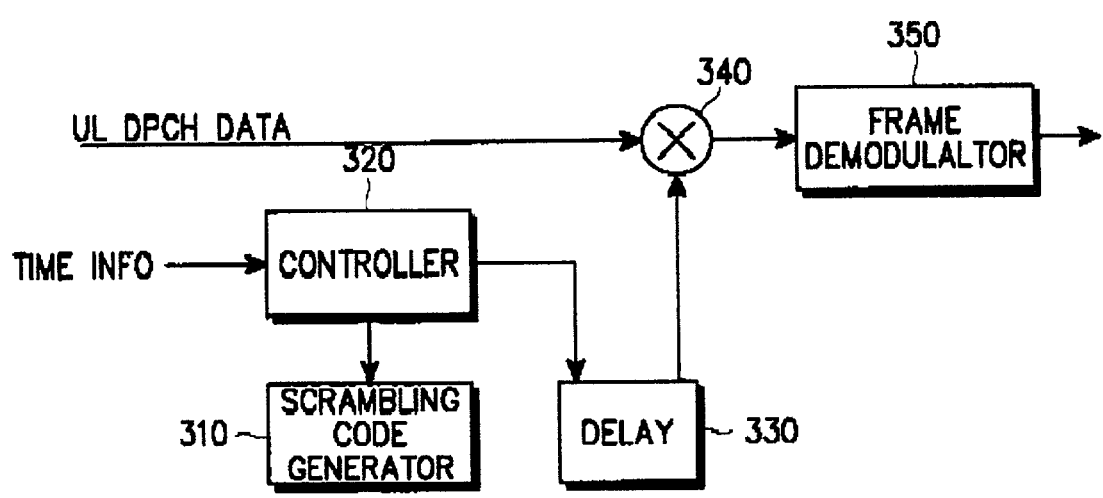
FIG. 16 is a block diagram illustrating a structure of a scrambling code synchronizer in a Node B according to the present invention

FIG. 16 is a block diagram of a scrambling code synchronizer in a Node B according to the present invention. Referring to FIG. 16, a scrambling code generator 310 generates a scrambling code for a UL DPCH assigned to the UE. A controller 320 receives USTS time information of the UE and controls the scrambling code generator 310 or a delay 330 based on the difference between the start point of the received UL DPCH and a scrambling code start point. The delay 330 delays the scrambling code by a scrambling code time offset according to a time information command received from the controller 320 to make the start points of the scrambling code and a frame identical. A multiplier 340 receives the UL DPCH data and multiplies the received UL DPCH data by the scrambling code received from the delay 330. A frame demodulator 350 demodulates the data received from the multiplier 340 using a channelization code.

The case where other UEs are using a scrambling code will be described below.

The SRNC transmits information about UL scrambling codes in use for USTS, UL DPDCH and DPCCH channelization codes, and a scrambling code start point serving as a reference time for the other UEs to the Node B. The information is transmitted by, for example the Radio Link Reconfiguration message. The scrambling code start point information may include information for 256×m basis synchronization and scrambling code synchronization. Then the Node B transmits time information measured using an established radio link, that is, a PD measurement to the SRNC. The PD is calculated by subtracting $T_O$ from the difference between the start points of a corresponding DL DPCH and a UL DPCH. The SRNC transmits the time information (PD) received from the Node B to the UE and the UE transmits data on the uplink for USTS according to the received time information.

In the case whether other UEs are using a scrambling code for the USTS service, the UE, the SRNC, and the Node B operate as described below, in comparison with the conventional UEs.

The UE requests conversion to the USTS mode to the Node B during communicating on a DPCH, or the Node B attempts conversion to the USTS mode for the UE that receives a service on a DPCH only after the USTS mode. The UE transmits UL DPCH data based on a time offset for USTS in the information received from the SRNC for conversion to the USTS mode. If the time offset is 0, the UE performs the conventional DPCH operation. On the contrary, if the time offset is not 0, the UE performs synchronization by the time offset. The time offset includes information required to make the difference between the start points of a current received UE frame and a P-CCPCH frame equal 256 chips×m, that is, time information representing how much earlier or later the UE should transmit a UL DPCH with respect to the previous UL DPCH, or information about a PD generated during transmission of a UL DPCH. If the UE receives the PD, it transmits the UL DPCH earlier by a time equal to the PD.

The SRNC determines the time offset and the UE receiving the time offset transmits the UL DPCH earlier or later by the time offset. If USTS scrambling code synchronization is based on a P-CCPCH, the SRNC transmits time information for the scrambling code synchronization and the UE delays a scrambling code by the time offset prior to transmission. The scrambling code synchronization can be performed by use of the scrambling code synchronizer shown in FIG. 4. Even if the scrambling code synchronization is based UE time, the SRNC transmits a corresponding offset to the UE and the UE performs the scrambling code synchronization according to the received time offset.

In the case where other UEs are using a scrambling code for the USTS service, the SRNC operates in the same manner as during the USTS mode conversion for the UE when it is the first one to be assigned to a scrambling code for the USTS service. Therefore, a description of the operation of the SRNC will be omitted.

The Node B also operates in the same manner as when the UE is the first one to be assigned to a scrambling code for the USTS service, except that it transmits different information in step 402 of FIG. 15.

In step 402, the Node B notifies the SRNC whether it will support the USTS mode conversion by a response message. Here, the Node B transmits the scrambling code time offset to the SRNC.

To supply information about the scrambling code time offset, the Node B transmits one of the time difference between the start points of a current received UE frame and a P-CCPCH frame, a value required to make the time difference equal 256 chips×m, a PD, and the time difference between the start points of a scrambling code and a corresponding frame. When the UE is the first one to be assigned to a scrambling code for the USTS service, there is no scrambling code serving as a reference, whereas when other UEs are operating in the USTS mode, the start point of the scrambling code in use for the UEs serves as a reference point. Therefore, a scrambling code offset is generated with respect to the scrambling code start point.

In the case where a target cell does not support a handover for the USTS service, the SRNC and the UE operate as follows.

In this case, the SRNC discontinues the USTS service based on a measurement report received from the UE and determines to establish a radio link with the new cell by the Radio Link Setup procedure or the Radio Link Addition procedure. Here, the SRNC converts the USTS mode to the normal mode for the UE by the Radio Link Reconfiguration procedure. The SRNC transmits the Active Set Update message or the Radio Bearer Reconfiguration message to notify the UE of the mode conversion procedure.

That is, the UE that was receiving the USTS service implements a handover in the following way.

After transmitting the Radio Link Setup Response message to the RNC or Node B of the new cell, the SRNC receives a response message from the RNC or Node B. If the SRNC receives information representing that the new cell does not support the USTS service by the response message, or has the information beforehand, it transmits the Radio Link Reconfiguration Prepare message to the Node B or RNC of an existing cell (one ore more radio links may exist) to convert the USTS mode to the normal mode for the UE. Then, the SRNC discontinues the USTS service for the UE and transmits a message for a typical DPCH service, for example, the Radio Bearer Reconfiguration signaling message. Signaling messages transmitted in the above second and third steps include time parameters or separate signaling messages indicating time are transmitted, so that the UE and each cell discontinue the USTS at the same time and use DPCHs.

If the UE that was using the USTS is to establish a new radio link in a handover area, the SRNC transmits the Radio Link Setup Response message or the Radio Link Addition Request message to a corresponding RNC or Node B. Upon receipt of the request message, the DRNC or Node B can transmit a response message to notify whether it supports the handover or not. The response message can be the Radio Link Setup Response message or the Radio Link Addition response message, as given in Table 4 below.

TABLE 4

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | Reject |
| CRNC Communication Context ID | M | | 9.2.1.18 | | YES | ignore |
| Transaction ID | M | | 9.2.1.62 | | | |
| Node B Communication Context ID | M | | 9.2.1.48 | The reserved value. All NBCC shall not be used. | YES | ignore |
| Communication Control Port ID | M | | 9.2.1.15 | | YES | ignore |
| RL Information Response | | 1 to <maxnoofRLs> | | | EACH | ignore |
| >RL ID | M | | 9.2.1.53 | | | |
| >RL Set ID | M | | 9.2.2.39 | | | |
| >UL interference level | M | | 9.2.1.67 | | | |
| >Diversity Indication | C-NotFirstRL | | 9.2.2.8 | | | |
| >CHOICE diversity>Indication | | | | | | |
| >>Combining | | | | | YES | ignore |
| >>>RL ID | M | | 9.2.1.53 | Reference RL ID for the combining | | |
| >>Non Combining or First RL | | | | | YES | ignore |
| >>>DCH Information Response | | 0 to <maxnoofDCHs> | | Only one DCH per set of coordinated DCH shall be included | | |
| >>>>DCH ID | M | | 9.2.1.20 | | | |
| >>>>Binding ID | M | | 9.2.1.4 | | | |
| >>>>Transport Layer Address | M | | 9.2.1.63 | | | |

TABLE 4-continued

| IE/Group Name | Presence | Range | IE type and reference | Semantics description | Criticality | Assigned Criticality |
|---|---|---|---|---|---|---|
| >DSCH Information Response | | 0 to <NumofDSCH> | | | GLOBAL | ignore |
| >>DSCH ID | M | | 9.2.1.27 | | | |
| >>Binding ID | M | | 9.2.1.4 | | | |
| >>Transport Layer Address | M | | 9.2.1.63 | | | |
| >SSDT Support Indicator | M | | 9 2 2 46 | | | |
| >USTS Support Indicator | C-USTS | | | | | |
| Cirticality diagnostics | O | | 9.2.1.17 | | YES | ignore |

In Table 4, USTS Support Indicator indicates whether cells in a corresponding Node B support the USTS service or not. USTS Support Indicator is conditional because it is transmitted only when the SRNC requests a USTS handover to the Node B. If the Node B transmits information indicating whether it supports the USTS service regardless of request from the SRNC, C-USTS is changed to M short in order to supply the USTS Support Indicator in the message.

In accordance with the present invention as described above, slot synchronization and frame synchronization can be achieved among UEs in a USTS where a plurality of UEs use a single scrambling code. Asynchronous UL DPCHs with different delays can be synchronized to one another in an initial synchronization.

A UE using the USTS service can implement a handover while maintaining the USTS service even in a target cell, to thereby continue the USTS service.

Furthermore, a data communication service is provided suitable for a cell by allowing a UE to transition from a normal mode or a non-USTS mode to a USTS mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A handover controlling method in a radio network controller (RNC) connected to a first Node B and a second Node B in a mobile communication system where an Uplink Synchronous Transmission Scheme (USTS) service occurs between the first Node B and a user equipment (UE) within a cell of the first Node B and the UE hands over when the UE is located in a handover area across cell areas of the first Node B and the second Node B, the cell area of the second Node B being adjacent to the cell area of the first Node B, the method comprising the steps of:
determining if handover for the UE is possible;
transmitting handover information to the second Node B if handover is possible, the handover information including a scrambling code of the UE, a scrambling code time offset representing a time difference between a start point of the scrambling code used for data communication between the UE and the first Node B and a start point of an uplink data frame, and a channelization code for a transmission channel of the data; and
transmitting a command to the UE through the first Node B, requesting the UE to hand over to the second Node B if the RNC receives a response message for the handover information from the second Node B indicating that handover is possible.

2. The method of claim 1, wherein the transmission channel is an uplink dedicated physical channel.

3. The method of claim 1, wherein the handover determination is determined by analyzing a measurement report received from the UE.

4. The method of claim 1, wherein the channelization code is an Orthogonal Variable Spreading Factor (OVSF) code.

5. The method of claim 1, wherein the handover information is information about the UE receiving the USTS service, and the handover information is stored in the RNC.

6. A handover controlling method in a Node B in a mobile communication system where an Uplink Synchronous Transmission Scheme (USTS) service occurs between a first Node B and a user equipment (UE) within a cell of the first Node B and the UE hands over when the UE is located in a handover area across cell areas of the first Node B and a second Node B, the cell area of the second Node B being adjacent to the cell area of first Node B, the method comprising the steps of:
receiving handover information indicating that the UE is receiving the USTS service from an radio network controller (RNC), the handover information including a channelization code for a data transmission channel of the UE, a scrambling code used for the data communication, and a scrambling code time offset representing a time difference between a start point of the scrambling code and a start point of an uplink data frame; and
transmitting a response message for the handover information to the RNC and assigning a handover channel according to the channelization code; and
performing scrambling code synchronization by setting the start point of the uplink data frame relative to the start point of the scrambling code according to the scrambling code time offset.

7. The method of claim 6, wherein the scrambling code synchronization step comprises:
delaying the scrambling code generated from the first Node B by the scrambling code time offset, for starting the scrambling code at a time later than a start point of a predetermined channel frame;
despreading uplink data received from the UE with the delayed scrambling code and the channelization code.

8. The method of claim 7, wherein the predetermined channel is a primary common control physical channel.

9. The method of claim 7, wherein the scrambling code time offset is a time difference between a start point of a current uplink data frame received from the UE and the start point of the predetermined channel frame.

10. The method of claim 9, wherein the predetermined channel is a primary common control physical channel.

11. The method of claim 7, wherein the scrambling code time offset is a value determined such that a time difference between a start point of a current uplink data frame received from the UE and the start point of the predetermined channel frame is equal to a multiple of 256 chips.

12. The method of claim 10, wherein the predetermined channel is a primary common control physical channel.

13. The method of claim 6, wherein the scrambling code time offset is calculated by subtracting a propagation delay from a time difference between a start point of an uplink transmission channel frame received from the UE and a downlink transmission channel frame.

14. A method of converting a non-Uplink Synchronous Transmission Scheme (USTS) mode to a USTS mode in a communication between a Node B connected to a radio network controller (RNC) and a user equipment (UE) within a cell area of the Node B, comprising the steps of:
  measuring by the Node B a round trip time (RTT) indicating a distance between the Node B and the UE;
  transmitting the measured RTT from the Node B to the RNC;
  transmitting from the RNC to the UE a scrambling code and a channelization code for use in the UE, and information representing a variance of a start point of a downlink data frame to be transmitted to the UE so that the downlink data frame starts at a position apart from a reference time point of the Node B by a multiple of a predetermined number of chips; and
  transmitting the scrambling code and the channelization code from the RNC to the Node B.

15. The method of claim 14, wherein the RNC determines whether to convert the non-USTS mode to the USTS mode for the UE by analyzing a measurement report received from the UE.

16. The method of claim 14, wherein the RNC determines whether to convert the non-USTS mode to the USTS mode for the UE upon receipt of a-USTS mode conversion request from the UE.

17. The method of claim 14, wherein the channelization code is for an uplink dedicated physical channel.

18. The method of claim 14, wherein the scrambling code is an uplink data scrambling code.

19. The method of claim 14, wherein a scrambling code time offset is a time difference between a start point of a current uplink data frame received from the UE and a start point of a primary common control physical channel frame.

20. The method of claim 14, wherein a scrambling code time offset is a value determined such that a time difference between a start point of a current uplink data frame received from the UE and a start point of a primary common control physical channel frame is equal to a multiple of 256 chips.

21. The method of claim 14, wherein a scrambling code time offset is calculated by subtracting a propagation delay from a time difference between a start point of an uplink transmission channel frame received from the UE and a start point of a downlink transmission channel frame.

22. A method of converting from a non- Uplink Synchronous Transmission Scheme (USTS) mode to a USTS mode in a communication between a Node B connected to an radio network controller (RNC) and a user equipment (UE) within a cell area of the Node B, comprising the steps of:
  receiving a message including information representing a variance of a start point of an uplink data frame received from the UE to make the uplink data frame start at a position apart from a reference time point of the Node B by a multiple of a predetermined number of chips, and a channelization code and a scrambling code of a transmission channel on which the uplink data is transmitted from the RNC;
  calculating a scrambling code time offset if it is determined that the USTS mode conversion is possible for the UE, and transmitting a response message including the scrambling code time offset to the RNC; and
  assigning the received channelization code and scrambling code to the communication and determining the start points of the uplink data frame and the scrambling code according to the scrambling code time offset, and transitioning to the USTS mode.

23. The method of claim 22, further comprising the steps of:
  delaying the scrambling code generated from the Node B by the scrambling code time offset to start the scrambling code at a position later than a start point of a predetermined channel frame by the scrambling code time offset;
  despreading uplink data received from the UE with the delayed scrambling code and the channelization code.

24. The method of claim 23, wherein the predetermined channel is a primary common control physical channel.

25. The method of claim 23, wherein the scrambling code time offset is a time difference between a start point of a current uplink data frame received from the UE and the start point of the predetermined channel frame.

26. The method of claim 23, wherein the scrambling code time offset is a value determined such that a time difference between a start point of a current uplink data frame received from the UE and the start point of the predetermined channel frame is equal to a multiple of 256 chips.

27. The method of claim 25, wherein the predetermined channel is a primary common control physical channel.

28. The method of claim 26, wherein the predetermined channel is a primary common control physical channel.

29. The method of claim 22, wherein the scrambling code time offset is calculated by subtracting a propagation delay from a time difference between a start point of an uplink transmission channel frame received from the UE and a start point of a downlink transmission channel frame.

30. A method of converting a non-Uplink Synchronous Transmission Scheme (USTS) mode to a USTS mode in a communication between a Node B connected to an radio network controller (RNC) and a user equipment (UE) within a cell area of the Node B, comprising the steps of:
  receiving a predetermined uplink signal from the UE, measuring a propagation delay of the received predetermined uplink signal, and transmitting the propagation delay measurement and a USTS mode conversion request to the RNC by the Node B;
  determining an additional delay based on the propagation delay measurement and transmitting the determined additional delay to the UE by the RNC; and
  starting to transmit an uplink data transmission channel signal by the UE after the propagation delay and the additional delay from reception of a downlink data transmission channel signal.

31. The method of claim 30, wherein the additional delay is calculated by subtracting twice the propagation delay between the downlink data transmission channel and the uplink data transmission channel from a common propagation delay.

32. The method of claim 31, wherein the common propagation delay is used by all UEs, being one of located in the same cell area of the Node B and using an identical USTS scrambling code, and an uplink dedicated physical channel signal received from the RNC has a predetermined delay corresponding to the UEs.

33. The method of claim 30, wherein a channel used for the predetermined uplink signal is a random access channel.

34. The method of claim 30, wherein a channel used for data transmission signals is a dedicated physical channel.

* * * * *